US010168783B2

(12) United States Patent
Harris et al.

(10) Patent No.: US 10,168,783 B2
(45) Date of Patent: Jan. 1, 2019

(54) METHOD OF DESIGNING A PANEL ASSEMBLY FOR A VIBRATORY PANEL DEVICE

(71) Applicant: NVF Tech Ltd., Cambridgeshire (GB)

(72) Inventors: Neil John Harris, Cambridgeshire (GB); Christopher Julian Travis, Gloucestershire (GB)

(73) Assignee: NVF Tech Ltd, London (GB)

(*) Notice: Subject to any disclaimer, the term of this patent is extended or adjusted under 35 U.S.C. 154(b) by 0 days.

(21) Appl. No.: 15/841,256

(22) Filed: Dec. 13, 2017

(65) Prior Publication Data
US 2018/0113513 A1 Apr. 26, 2018

Related U.S. Application Data

(63) Continuation of application No. 14/836,667, filed on Aug. 26, 2015, now Pat. No. 9,880,625, which is a (Continued)

(30) Foreign Application Priority Data

May 18, 2012 (GB) .................................. 1208851.4
May 18, 2012 (GB) .................................. 1208852.2
May 18, 2012 (GB) .................................. 1208853.0

(51) Int. Cl.
*G06F 3/041* (2006.01)
*G06F 3/01* (2006.01)
(Continued)

(52) U.S. Cl.
CPC .............. *G06F 3/016* (2013.01); *G06F 3/041* (2013.01); *G06F 3/0416* (2013.01);
(Continued)

(58) Field of Classification Search
CPC ........ G06F 3/016; G06F 3/041; G06F 3/0416; G06F 3/043; G06F 3/0436
See application file for complete search history.

(56) References Cited

U.S. PATENT DOCUMENTS 6,985,596 B2 * 1/2006 Bank ...................... H04R 7/045
381/152
7,643,015 B2 * 1/2010 Paradiso ............... G06F 3/0433
178/18.04
(Continued)

FOREIGN PATENT DOCUMENTS

EP         2381340        10/2011
WO    WO 2011/102898      8/2011
WO    WO 2012/052803      4/2012

OTHER PUBLICATIONS

European Office Action dated Sep. 5, 2016 in counterpart European Application No. 13735058.3 (8 pages in English).
(Continued)

*Primary Examiner* — Vijay Shankar
(74) *Attorney, Agent, or Firm* — Fish & Richardson P.C.

(57) ABSTRACT

There is disclosed a method of designing a panel assembly for a vibratory panel device, the assembly comprising a panel which supports vibrations and two or more transducers coupled to the panel to transmit vibrations to or receive vibrations from the panel. The method comprises: obtaining the number of transducers to be used in the assembly and their relative positions; obtaining relationships between drive signals to be applied to the respective transducers to provide a desired effect; determining an optimization criterion for the assembly that depends on the obtained relationships; and determining one or more parameters for the respective transducers that satisfy the optimization criterion.
(Continued)

The one or more parameters may be selected from amplitudes of drive signals, spacing, activity, area, position, shape, dimension.

20 Claims, 24 Drawing Sheets

Related U.S. Application Data continuation of application No. 14/401,819, filed as application No. PCT/GB2013/051291 on May 17, 2013, now abandoned, said application No. 14/836,667 is a continuation of application No. 14/402,086, filed as application No. PCT/GB2013/051293 on May 17, 2013, now abandoned, said application No. 14/836,667 is a continuation of application No. 14/402,091, filed as application No. PCT/GB2013/051292 on May 17, 2013, now abandoned.

(51) Int. Cl.
*G06F 3/043* (2006.01)
*H04R 5/04* (2006.01)
*H04R 7/04* (2006.01)
*H04R 3/02* (2006.01)
*G06F 3/16* (2006.01)
*H04R 17/00* (2006.01)

(52) U.S. Cl.
CPC ............ *G06F 3/0436* (2013.01); *G06F 3/167* (2013.01); *H04R 3/02* (2013.01); *H04R 5/04* (2013.01); *H04R 7/045* (2013.01); *H04R 17/005* (2013.01); *H04R 2400/01* (2013.01); *H04R 2400/03* (2013.01); *H04R 2440/05* (2013.01); *H04R 2499/11* (2013.01); *H04R 2499/15* (2013.01); *H04S 2400/05* (2013.01)

(56) References Cited

U.S. PATENT DOCUMENTS

| | | | |
|---|---|---|---|
| 8,576,171 B2* | 11/2013 | Grant | G06F 3/016 345/163 |
| 8,780,060 B2* | 7/2014 | Maschmeyer | G06F 3/016 345/173 |
| 9,041,662 B2* | 5/2015 | Harris | G06F 3/016 178/18.04 |
| 2002/0067841 A1 | 6/2002 | Bank et al. | |
| 2003/0217873 A1 | 11/2003 | Paradiso et al. | |
| 2006/0097996 A1 | 5/2006 | Tabata | |
| 2006/0262104 A1 | 11/2006 | Sullivan et al. | |
| 2010/0141408 A1 | 6/2010 | Doy et al. | |
| 2011/0090167 A1 | 4/2011 | Harris | |
| 2012/0038582 A1 | 2/2012 | Granty | |
| 2012/0105333 A1 | 5/2012 | Maschmeyer et al. | |

OTHER PUBLICATIONS

International Search Report dated Aug. 1, 2013 in parent International Application No. PCT/GB2013/051292 (2 pages in English).
International Search Report dated Nov. 13, 2013 in patent International Application PCT/GB2013/051293 (3 pages in English).
International Search Report dated Feb. 6, 2014 in parent International Application No. PCT/GB2013/051291 (5 pages in English).

* cited by examiner 1  2  3

4  5

| A | -(A+B)/2 | B |
|---|---|---|
| -(A+C)/2 | ? | -(B+D)/2 |
| C | -(C+D)/2 | D |

FIG. 14

| A | -(A+B)/2 -X/4 | B |
|---|---|---|
| -(A+C)/2 -X/4 | X | -(B+D)/2 -X/4 |
| C | -(C+D)/2 -X/4 | D |

FIG. 15

| 1 | -(1+X/4) | 1 |
|---|---|---|
| -(1+X/4) | X | -(1+X/4) |
| 1 | -(1+X/4) | 1 |

FIG. 16

Plot against β of modified f(n, β) with no spurious zeros

Optimum β vs n by first order model

Variation of (γ-σ) with σ for 4:3 rectangle

Optimum β vs *n* by high-order model for square panel

Diagram of 1/4 of panel for (4+1) signal 'rectangular' geometry options

Graph of the relationship between c and d for a/b=4/3

Diagram of 1/4 of panel for (4+1) signal 'rectangular, side-driven' geometry options Graph of c vs d constraints for side-driven system Trapezoidal patch geometry (corner drive case)

Optimised values of mean and FOM by aspect ratio for 4+4 system with c2=d2=0

METHOD OF DESIGNING A PANEL ASSEMBLY FOR A VIBRATORY PANEL DEVICE

CROSS-REFERENCE TO RELATED APPLICATIONS

This application is a continuation of application Ser. No. 14/836,667, filed Aug. 26, 2015, which is a continuation of application Ser. No. 14/401,819, filed Nov. 17, 2014, which is a U.S. national stage application of PCT/GB2013/051291, filed May 17, 2013, which claims the benefit of the filing date of GB1208852.2, filed May 18, 2012, and a continuation of application Ser. No. 14/402,091, filed Nov. 18, 2014, which is a U.S. national stage application of PCT/GB2013/051292, filed May 17, 2013, which claims the benefit of the filing date of GB1208851.4, filed May 18, 2012, and a continuation of application Ser. No. 14/402,086, filed Nov. 18, 2014, which is a U.S. national stage application of PCT/GB2013/051293, filed May 17, 2013, which claims the benefit of the filing date of GB1208853.0, filed May 18, 2012. The entire disclosures of all of these applications are hereby incorporated by reference.

BACKGROUND

Devices of the type described above are used in a variety of applications. One example is the provision of haptic feedback in touch sensitive devices. Here, the transducers are controlled to cause the panel to vibrate in order to provide haptic feedback to a user in response to the device being touched. The same panel may be used in the detection of touch. The same transducers may be used for sensing touch as the transducers used for generating the haptic feedback. Alternatively separate transducers may be provided for touch sensing and haptic feedback generation respectively.

Vibratory panels, i.e. panels capable of producing or detecting vibrations, are also used in the generation and/or sensing of audio signals. Thus devices comprising such panels may be used as, or form part of, speakers and/or microphones.

A common use of haptic feedback is in hand held electronic devices such as phones and other communications devices having touch sensitive screens. The haptic feedback is provided to the user to confirm that a touch has been detected. A typical device capable of providing haptic feedback comprises a vibratory panel and two transducers mounted with respect to the panel so as to cause the panel to vibrate when energised. Electrical signals to be applied to the transducers are typically generated by a control chip providing signals on respective channels. The use of two transducers allows the possibility of "steering" the feedback in one dimension, i.e. to control to some degree the point on the screen where the haptic feedback vibration peaks. This can be done by using the relative strengths of signals applied to the two transducers to control the point on the screen at which the peak of the vibration occurs.

In some situations it is desired for haptic feedback to be silent. In principle, with a two channel system, this could be achieved by ensuring that the signals on the two channels are out of phase. However, no steering would then be possible. It would therefore be advantageous to be able to reduce acoustic output in a haptic feedback system whilst still being able to steer the haptic feedback. Analogous problems occur with touch sensing and the generation or sensing of audio or acoustic signals.

SUMMARY

In one aspect there is provided a panel for use in a vibratory panel device comprising a substrate, a layer of electroactive material applied to the substrate and a layer of material applied to the electroactive material forming separate active areas whereby signals may be applied to or received from respective areas of the electroactive material, wherein the layer of material forming the active areas forms at least three active areas comprising at least two primary active areas and at least one secondary active area, the secondary active area being positioned relative to the two primary active areas such that one or both of the following conditions is provided: at least one secondary active area can be driven to at least partially offset any net displacement of the panel caused by driving two of the primary active areas; and the at least one secondary active area can sense vibrations of the panel affecting both of the two primary active areas.

Electroactive materials are materials that exhibit a change in their electrical properties when they undergo a change in their physical characteristics, for example their shape or size.

Preferably, the at least one secondary active area is arranged partially or wholly between the two primary active areas.

Preferably, the active areas have equal areas.

Preferably, the active areas are square or rectangular.

Preferably, the at least one secondary active areas is circular or elliptical.

Preferably, the circular or elliptical active area is at least partially surrounded by the two primary active areas.

Preferably, the at least one secondary active area comprises two active areas each arranged partially or wholly between the two primary active areas and arranged to be driven in common.

Preferably, at least one secondary active area is separated from each of the two primary active areas by an arcuate boundary extending to the edge of the panel.

Preferably, the at least one secondary active area and the two primary active areas form a symmetrical arrangement.

Preferably, the active area material forms three active areas which occupy substantially the whole area of the panel.

Preferably, the substrate is square or rectangular.

Preferably, the layer of material forming the active area forms at least four primary active areas arranged around the periphery of the panel with said at least one secondary active area arranged for either or both of:

being driven to at least partially offset any net displacement of the panel caused by driving the at least four active areas; and sensing vibrations of the panel affecting the at least four active areas.

Preferably, e at least one secondary active area is arranged in a central region of the panel.

Preferably, the panel comprises one secondary active area having at least one portion extending to a region between two of the at least four primary active areas.

Preferably, the one secondary active area has portions extending to respective regions between each of the at least four primary active areas.

Preferably, the panel comprises four primary active areas arranged around the periphery of the panel.

Preferably, the panel is square or rectangular.

Preferably, the primary active areas are arranged at the corners of the panel and have edges extending parallel to the edges of the panel.

Preferably, the active areas each have two straight edges extending across the panel.

Preferably, one or both of the two straight edges of each active area is not parallel to the edge of the panel.

Preferably, the layer of material forming the active areas forms at least four primary active areas arranged around the periphery of the panel with at least two secondary active areas arranged for either or both of:

being driven to at least partially offset any net displacement of the panel caused by driving two of the at least four active areas; and sensing vibrations of the panel affecting two of the at least four active areas.

Preferably, the panel comprises four primary active areas and two secondary active areas each arranged at least partially between opposing pairs of the four primary active areas.

Preferably, each secondary active area is arranged to be driven to at least partially offset any net displacement of the panel caused by driving the opposite pair of primary active areas.

Preferably, each secondary active a area is arranged to sense vibrations of the panel affecting the opposite pair of primary active areas.

Preferably, the panel comprises an even number of at least four primary active areas arranged around the periphery of the panel and a secondary active area arranged at least partially between each pair of said at least four active areas.

Preferably, each secondary active area extends towards the centre of the panel.

Preferably, at least two of the secondary active areas are connected in common.

Preferably, the panel is square or rectangular.

Preferably, the primary active areas at the panel corners have outer edges parallel to the panel edges.

Preferably, the panel includes four primary active areas arranged at the corners of the panel.

Preferably, the said active areas are arranged to be driven to apply signals to the electroactive material, and additional active areas are provided for sensing pressure applied to the substrate via the electroactive material.

Preferably, the said active areas are arranged to be driven to apply signals to the electroactive material, and one or more additional active areas are provided for sensing pressure applied to the substrate via the electroactive material.

Preferably, each additional active area is situated within the area of one of the primary active areas.

Preferably, the respective primary and secondary active areas are configured to minimise differences in amplitude of drive signal required for different active areas.

Preferably, the net displacement of the panel is caused by acoustic vibration.

Preferably, the net displacement of the panel is caused by mechanical vibration.

Preferably, e electroactive material comprises one of:
piezoelectric material,
pyroelectric,
electrostrictive material, and
shape memory material.

Preferably, the active areas comprise electrodes.

In a further aspect there is provided an assembly comprising a panel as described above and a control circuit configured to apply signals to or receive signals from the respective transducers.

Preferably, the at least one secondary active area can be driven to at least partially offset any net displacement of the panel caused by driving two of the primary active areas, and a control circuit configured to apply signals to the respective transducers.

Preferably, the control circuit is configured to apply signals to the (primary active areas to provide haptic feedback in response to an input stimulus to the panel and to apply respective signals to the one or more secondary active areas to minimise any acoustic vibration that would otherwise occur as a result of the haptic feedback.

Preferably, the control circuit is configured to apply signals to the primary active areas to generate audio signals and to apply respective signals to the one or more secondary active areas to provide a secondary audio effect.

Preferably, the at least one secondary active a area can sense vibrations of the panel affecting two or more primary active areas and a signal processing circuit is provided which is configured to process signals from the respective active a areas.

Preferably, the signal processing circuit is configured to use the signals from the one or more secondary active areas to correct signals from the primary active areas for one or more phenomena affecting all of the active areas.

Preferably, the processing circuit is configured to process audio signals received via the respective active areas.

Preferably, the signal processing circuit is configured to process signals received via the respective active areas as a result of finger pressure.

In a further aspect there is provided a method of designing a panel assembly for a vibratory panel device, the assembly comprising a panel which supports vibrations and two or more transducers coupled to the panel to transmit vibrations to or receive vibrations from the panel, the method comprising:

obtaining the number of transducers to be used in the assembly and their relative positions;

obtaining relationships between drive signals to be applied to the respective transducers to provide a desired effect;

determining an optimisation criterion for the assembly that depends on the obtained relationships; and determining one or more parameters for the respective transducers that satisfy the optimisation criterion.

Preferably, the one or more parameters for the respective transducers are selected from:
amplitudes of drive signals,
spacing,
activity,
area,
position,
shape,
dimension.

Preferably, the optimisation criterion is minimum energy cost and determination of the energy cost comprises determining an energy cost function that depends at least on amplitudes of the drive signals and the obtained relationships.

Preferably, the one or more parameters comprise amplitudes of drive signals e applied to the respective transducers.

Preferably, the determined energy cost function depends on the areas of the respective transducers.

Preferably, the method comprises placing additional constraints on the relationships between drive signals and determining one or more other parameters for the transducers based on those additional constraints.

Preferably, an additional constraint is equal amplitude of drive signal for at least two transducers and the method comprises determining one or more dimensions for the transducers that minimise the energy cost with this additional constraint.

Preferably, the determined energy cost function depends on the activities of the respective transducers.

Preferably, the method includes determining an energy cost exponential n defining the extent to which the energy cost depends on transducer area and including n in the energy cost function.

Preferably, the method comprises placing constraints on parameters of the transducers to enable the determination of a relationship between energy cost exponential and a transducer dimension.

Preferably, the method comprises determining the value of energy cost exponential for a panel assembly and using the determined relationship to determine the transducer dimension.

Preferably, the optimisation criterion is equal drive strength amplitudes.

Preferably, the determination of one or more parameters for the transducers comprises determining one or more of activity, area, position, shape and dimension.

Preferably, the optimisation criterion is uniformity of achievable excitation over a region of the panel.

Preferably, uniformity of the achievable excitation is determined from the absence of nodes in the displacement field over the region of the panel.

Preferably, uniformity of the achievable excitation is determined from the mean of maximum possible displacements over the area of the panel.

Preferably, uniformity of the achievable excitation is determined from the ratio of said mean to standard deviation.

Preferably, the desired effect is localised vibration of the panel with no net displacement.

Preferably, the number of transducers is three and one transducer is required to be driven in the opposite direction to the other two.

Preferably, the panel is rectangular and the number of transducers includes four positioned to drive the panel to cause localised vibrations and one or more additional transducers for offsetting any net vibration caused by the localised vibration.

Preferably, the four transducers are positioned at the corners of the panel.

Preferably, the four transducers are positioned between respective pairs of corners of the panel.

Preferably, the desired effect is maximum displacement of the panel.

Preferably, the method further comprises constructing a panel assembly using the determined parameters.

In a further aspect there is provided a method of generating a primary effect in a device comprising a panel which supports vibrations and at least N+M transducers connected to the panel, where N and M are integers greater than or equal to 1, each transducer being electrically connected to signal processing circuitry and the signal processing circuitry being configured to receive signals from or provide signals to each transducer, the method comprising:
  obtaining N electrical signals to be applied respectively to N of the transducers to produce the primary effect; and
  processing the N electrical signals to produce M additional electrical signal(s), such that when the M signal(s) are applied to respective transducers other than the N transducers, a secondary effect is produced.

Preferably, the processing of the N electrical signals comprises processing a pair of N signals to generate an additional M signal according to the formula $C=-(L+R)/2$, where L and R are control signals to be applied to respective ones of the N transducers and C is a control signal to be applied to one of the M transducers.

Preferably, the N electrical signals are configured to enable the device to provide haptic feedback in response to an input stimulus and the M additional signal(s) are configured to reduce any acoustic vibration that would otherwise occur on application of the N signals to the respective transducers.

Preferably, the M additional signals are configured such that their application to respective transducers causes a reduction of any net displacement of the device caused by the application of the N signals to respective transducers.

Preferably, the N electrical signals are configured to enable the device to generate audio signals and the M additional signals are for use in audio signal generation.

Preferably, the method further comprises additionally obtaining N electrical signals for audio signal generation and processing the N electrical signals for audio signal generation to produce M additional electrical signals) for use in audio signal generation, such that when the M additional signals) for audio signal generation are applied to respective transducers other than the N transducers a side effect to audio signal generation by the N transducers is produced.

Preferably, the M additional signals for use in audio signal generation are configured to boost the acoustic output.

Preferably, the processing of the N electrical signals comprises processing a pair of N signals to generate an additional M signal for use in audio signal generation according to the formula $C=+(L+R)/2$, where L and R are control signals to be applied to respective ones of the N transducers and C is a control signal to be applied to one of the M transducers.

Preferably, the M additional signals for use in audio signal generation are configured to reduce mechanical vibration in the device when applied to the M transducers.

Preferably, the processing of the N electrical signals comprises processing a pair of N signals to generate an additional M signal according to the formula $C=-(L+R)/2$, where L and R are control signals to be applied to respective ones of the N transducers and C is a control signal to be applied to one of the M transducers.

Preferably, the N signals are supplied to signal processing circuitry which outputs the original N signals as well as the M signals.

Preferably, N is greater than M.

Preferably, $M=N/2$.

Preferably, $M=1$ and $N=2$.

In a further aspect there is provided a method of obtaining a desired response from a device comprising a panel which supports vibrations and N+M transducers connected to the panel, where N and M are integers greater than or equal to one, each transducer being electrically connected to signal processing circuitry and the signal processing circuitry being configured to receive signals from or provide signals to each transducer, the method comprising:
  receiving N+M electrical signals generated from respective ones of the N+M transducers in response to a physical action on the panel that is desired to be sensed, and
  processing the N+M signals to produce N signals corresponding to signals from N respective ones of the N+M transducers, wherein the signals from the other M transducers are used to correct the signals from the N transducers for one or more phenomena affecting all of the transducers other than the physical action.

Preferably, the device is configured to sense acoustic vibrations and the signals from the M transducers are used to reduce background noise in the signals from the N transducers.

Preferably, the device is configured to sense acoustic vibrations and the signals from the M transducers are used to improve the sensitivity of the device to low frequency vibrations.

Preferably, the device is configured to sense touch and the signals from the M transducers are used to reduce the effects of common mode vibrations in the signals from the N transducers.

Preferably, N is greater than M.

Preferably, M=N/2.

Preferably, M=1 and N=2.

In a further aspect there is provided signal processing apparatus configured to implement any of the methods described above.

In a further aspect there is provided a control circuit for a vibratory panel device comprising signal processing apparatus configured to implement any of the methods relating to generating a primary effect and a control signal generator configured to generate the N signals.

Preferably, the control circuit for a vibratory panel device comprises signal processing apparatus configured to implement the method relating to generating a primary effect, and a control signal generator configured to generate the N signals for use in providing haptic feedback.

Preferably, the control circuit further comprises a control signal generator configured to generate the N electrical signals for audio signal generation.

In a further aspect there is provided a computer readable medium bearing instructions which when implemented in signal processing apparatus cause the apparatus to implement the any of the above methods.

In a further aspect there is provided a device comprising a panel which supports vibrations, N+M transducers connected to the panel, where N and M are integers greater than or equal to one, and signal processing circuitry, each transducer being electrically connected to the signal processing circuitry and the signal processing circuitry being configured to:
  obtain N electrical signals to be applied respectively to N of the transducers to produce a primary effect; and
  process the N electrical signals to produce M additional electrical signal(s), such that when the M signal(s) are applied to respective transducers other than the N transducers, a secondary effect is produced.

Preferably, the device further comprises a control circuit adapted to generate the N electrical signals for input to the N transducers, in which the signals output from the control circuit are input to the signal processing circuitry.

Preferably, the N electrical signals are configured to enable the device to provide haptic feedback in response to an input stimulus and the M additional signal(s) are configured to reduce any acoustic vibration that would otherwise occur on application of the N signals to the respective transducer(s).

Preferably, the M additional signals are configured such that their application to respective transducers causes a reduction of any net displacement of the device caused by the application of the N signals to respective transducers.

Preferably, the processing of the N electrical signals comprises processing a pair of N signals to generate an additional M signal according to the formula $C=-(L+R)/2$, where L and R are control signals to be applied to respective ones of the N transducers and C is a control signal to be applied to one of the M transducers.

Preferably, the N electrical signals are configured to enable the device to generate audio signals and the M additional signals are for use in audio signal generation.

Preferably, the transducers are additionally used for audio signal generation in which the signal processing circuitry is configured to additionally obtain N electrical signals for audio signal generation and to process the N electrical signals for audio signal generation to produce a set of M additional electrical signal(s) for use in audio signal generation, such that when the M additional signal(s) for audio signal generation are applied to respective transducers other than the N transducers a side effect to audio signal generation is produced.

Preferably, the M additional signals for use in audio signal generation are configured to boost the acoustic output.

Preferably, the processing of the N electrical signals comprises processing a pair of N signals to generate an additional M signal for use in audio signal generation according to the formula $C=+(L+R)/2$, where L and R are control signals to be applied to respective ones of the N transducers and C is a control signal to be applied to one of the M transducers.

Preferably, the M additional signals for use in audio signal generation are configured to reduce mechanical vibration leakage in the device.

Preferably, the processing of the N electrical signals comprises processing a pair of N signals to generate an additional M signal according to the formula $C=-(L+R)/2$, where L and R are control signals to be applied to respective ones of the N transducers and C is a control signal to be applied to one of the M transducers.

Preferably, N is greater than M.

Preferably, M=N/2.

Preferably, N=2 and M=1.

In a further aspect there is provided a device comprising a panel which supports vibrations, N+M transducers connected to the panel, where N and M are integers greater than or equal to one, and signal processing circuitry, each transducer being electrically connected to the signal processing circuitry and the signal processing circuitry being configured to:
  receive N+M electrical signals generated from respective ones of the N+M transducers in response to a physical action on the panel that is desired to be sensed, and
  process the N+M signals to produce N signals corresponding to respective ones of the N transducers,
  wherein the signals from the other M transducers are used to correct the signals from the M transducers for one or more phenomena other than the physical action affecting all of the transducers.

Preferably, the device may be configured to sense acoustic vibrations in which the signals from the M transducers are configured to reduce background noise in the signals from the N transducers.

Preferably, the device may be configured to sense touch in which the signals from the M transducers are configured to reduce the effects of common mode vibrations in the signals from the N transducers.

Preferably, the device may be configured to sense acoustic vibrations in which the signals from the M transducers are configured to improve the sensitivity of the device to low frequency vibrations.

Preferably, N−M=M/2.

Preferably, M=1 and N=2.

Preferably, the device is one of a mobile communications device, tablet computing device and portable personal computer.

In a further aspect there is provided a device in which the panel comprises a substrate, a layer of electroactive material applied to the substrate and a layer of material applied to the electroactive material forming separate active areas whereby signals may be applied to or received from respective areas of the electroactive material, wherein the layer of material forming the active areas forms at least three active areas comprising at least two primary active areas and at least one secondary active area, the secondary active area being positioned relative to the two primary active areas such that one or both of the following conditions is provided:

at least one secondary active area can be driven to at least partially offset any net displacement of the panel caused by driving two of the primary active areas; and the at least one secondary active area can sense vibrations of the panel affecting both of the two primary active areas.

BRIEF DESCRIPTION OF THE DRAWINGS

Embodiments of the systems, apparatus and methods described above will now be described by way of example only and with reference to the accompanying drawings in which:

FIGS. 14 to 17 show different possible drive arrangements for a panel having nine electrodes;

The following description begins with the use of one or more (M) additional channels in vibratory panel devices for use in causing or reducing a side or secondary effect separate from a main or primary effect intended by (N) primary channels. There is then a discussion of how the size, shape and placement of a transducer in relation to a panel can influence the field of displacement and the circuit components required to drive it. These two themes are then brought together in a discussion of how the size, shape and placement of transducers can be optimised in a vibratory panel device having N primary channels and M additional channels derived from the primary channels.

Before these are discussed in detail, it is helpful to consider the ability of a designer to manipulate the resonant behaviour of a substrate to provide a beneficial response. Such responses may be:

Maximum velocity or force at a point to generate a haptic sensation or localised audio Minimum velocity or force at a point to prevent a haptic sensation Maximum asymmetric modes for acoustic output Maximum symmetrical modes for 'silent' haptics Stereo acoustic output With two or more degrees of freedom it is possible to combine effects and it is also possible to add functionality. For example, it might be possible to minimise input power while maintaining acoustic or haptic output, or minimise mechanical vibrations while maintaining acoustic or haptic output. These are just examples of combinations of effects that might be achieved given sufficient degrees of freedom.

The number of degrees of freedom is related to the number of actuators or actuators provided for a vibratory panel device. If there are n actuators or active areas, it follows that there are n−1 degrees of freedom. An example is a one actuator system that has zero degrees of freedom so you get what you get.

A two actuator system has one degree of freedom, allowing different signals or adjustments to the level, phase and delay to manipulate the modal behaviour of the substrate. It is usual to spend the one degree of freedom to maximise haptic or acoustic response.

Things get interesting in a 3 or 4 actuator system. The additional degrees of freedom allow further manipulation such as simultaneous maximisation and minimisation of force/velocity at different locations, minimising input power while maintaining output etc. These are exploited in some of the example panel actuator arrangements described below.

N to M Signal Matrix for Multi-Channel Signal Generation or Processing

Figure 1A:
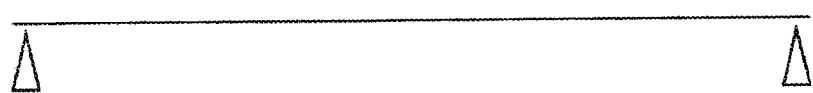
FIGS. 1(a) to 1(d) are schematic diagrams showing a number of possible modes of vibration of a simply supported beam.
Figure 1B:
Figure 1C:

Consider the case of a flexible beam mounted at its ends as shown in FIG. 1(a). The beam is provided with two transducers. The transducers can be energised to cause the beam to bend in a number of ways. The principle bending modes are monopole as shown in FIG. 1(b) where the transducers are driven in the same direction, i.e. in phase and dipole as shown in FIG. 1(c) where the transducers are driven in opposite directions or out of phase. The beam may be caused to vibrate in either mode, for example to provide haptic feedback e.g. in response to being touched. It is clear that the monopole mode results in the maximum displacement of the beam and hence the strongest haptic feedback. In dipole mode there is no net displacement of the beam from the horizontal. The sum of the displacements of individual parts of the beam adds up to zero. Nevertheless the vibration can be sensed, for example by a finger touching the beam. It will be noted that there is no displacement at the axis of symmetry. Here there is a "dead spot" where there is no net displacement and hence vibration that can be sensed and no haptic feedback in this region.

The large displacement of the beam occurs in the monopole mode and this can result in one or more side effects to the haptic feedback, otherwise referred to herein as an additional or secondary effect. For example this may result in an audible vibration, which is undesirable if silent operation is required. Also, in the case of the beam being mounted in a device, there are other possible common mode effects, such as the vibration being transmitted through to the device housing. This can cause the device to vibrate audibly when placed on a surface. For some implementations of a vibratory panel, such as in a mobile communication device operating in silent mode, any acoustic effect accompanying haptic feedback is undesirable.

One way to avoid an acoustic effect in a device where haptic feedback is required (referred to below as "silent haptics") is not to use the monopole mode. This can be achieved by ensuring that the signal channels controlling the transducers are always out of phase. However this has the drawback of resulting in a dead area or node where no haptic feedback can be provided. Also, where the channels are in phase it is possible to control the magnitudes of the signals to the respective transducers to vary where the displacement is at a maximum. Thus a degree of "steering" of the response is possible along the length of the beam. If the channels have to be out of phase this possibility of steering is lost.

Figure 1D:

Another way to avoid the acoustic effect is through the use of an additional transducer, as shown in FIG. 1(d). In FIG. 1(d) the additional transducer is placed in the centre of the beam symmetrically between the transducers illustrated in FIG. 1(a). This symmetrical placement is preferred but not essential as will become clear in the following. By driving the additional transducer in the opposite direction to the other transducers it is now possible to introduce a further mode of vibration illustrated in FIG. 1(d) which permits displacement of the beam on the axis of symmetry with no net displacement of the beam. The result is an arrangement that can be driven to provide haptic feedback over the entire length of the beam. The fact that there is no net displacement also results in a reduction of any audio signal or other vibration caused by a large net displacement of the beam.

The foregoing discusses a simple example where an additional transducer may be used to reduce acoustic signal generation in an arrangement intended for providing haptic feedback. The same principle may be extended to two dimensions as will be explained. It can also be used to reduce unwanted haptics effects in sound generation.

Provision of haptic feedback and audio signal generation are two examples of the principle where the transducers are driven to cause the beam to vibrate. The principle can also be used in reverse, where the transducers sense vibration of the beam, for example due to touch or acoustic vibration (as in a microphone). Here an additional transducer can be used to eliminate unwanted signals such as common mode vibrations from a wanted signal.

Figure 2:
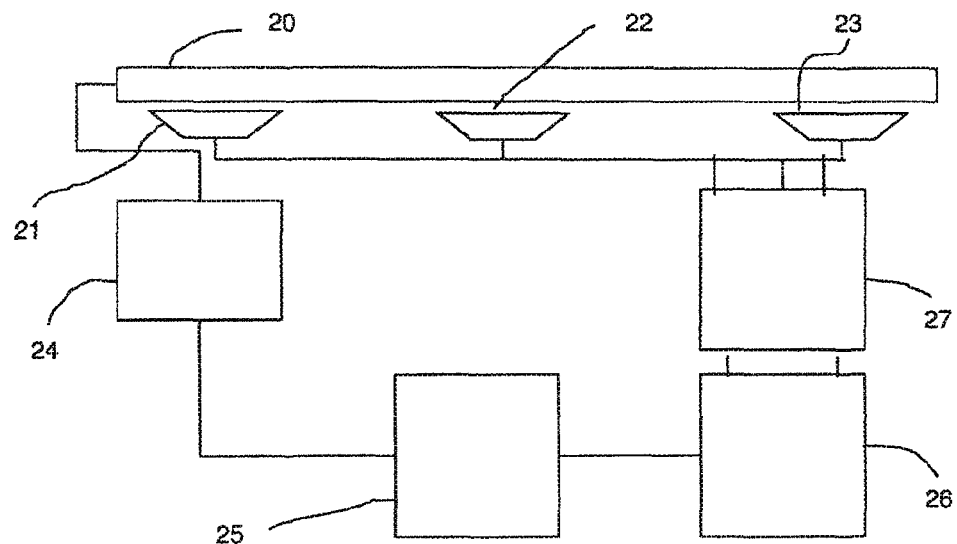
FIG. 2 shows schematically the basic components of a vibratory panel device.

Referring now to the drawings, FIG. 2 shows schematically the basic components of a vibratory panel device. Such a device could be any device comprising a touch sensitive panel such as a hand held mobile communication device, e.g. smart phone, a larger device with a touch screen such as a tablet computing device, or any other device comprising a touch sensitive screen. In such a device, the vibratory panel could be used to provide haptic feedback and/or for touch sensing. The vibratory panel device could also be designed to sense or generate audio signals and thus function as a speaker or microphone. Two or more of the functions described above could be incorporated into a single device.

The device illustrated in FIG. 2 comprises a vibratory panel or member 20. The panel 20 supports vibrations, such as bending wave vibrations or surface acoustic waves. The vibratory panel 10 has a number of actuators, transducers or exciters 21, 22, 23, hereinafter referred to as transducers, attached, coupled, connected or mounted to it. The transducers are able to vibrate the panel 20 in response to applied electrical signals. Conversely the transducers may be able to detect vibrations of the panel in response to an outside stimulus such as touch or sound. Thus signals may be applied to or detected by the transducers in order to provide one or more of a haptics sensation, touch sensitivity, audio generation or audio sensing (e.g. as in a microphone). The illustrated device further comprises circuitry comprising components 24, 25, 26 and 27. The illustrated device is configured to provide an appropriate response to an input stimulus. Thus the components 24, 25, 26 are provided for, respectively:

receiving and interpreting signals from the vibratory panel 20
  determining an appropriate response and requesting an appropriate output from the panel
  receiving request information and generating appropriate signals for controlling one or more of the transducers to provide the appropriate response.

Components 24, 25 and 26 could be implemented in hardware, software or a combination of the two.

It should be noted that the step of generating appropriate signals for controlling one or more of the transducers could include consulting one or more look-up tables for the signals necessary to provide the appropriate response.

Consider the situation in which the device illustrated in FIG. 2 is configured to provide haptic feedback. In this configuration, component 24 receives touch information from the vibratory panel. For convenience this is illustrated as a single output from the panel. However in practice component 24 will typically receive touch information from one or more transducers coupled to the vibratory panel 20. These may be one or more of the illustrated transducers 21, 22, 23 or they could be separate transducers, not shown. For example the device may have one or more transducers dedicated to sensing and one or more transducers dedicated to providing an output such as haptic feedback.

Circuit component 24 sends touch information to component 25 which determines the appropriate response and requests an appropriate output from the panel. Thus component 25 processes the touch information and provides haptics request information to haptics control circuit 26. Control circuit 26 then generates appropriate signals for one or more of the transducers 21, 22 and 23. This may be achieved by the haptics controller being configured to apply appropriate algorithms to the haptics request information to generate signals comprising the haptic response information. These signals are sent to appropriate ones of the transducers to provide haptic feedback. Alternatively, the haptics controller may consult one or more look-up tables to determine what signal should be generated. Look up tables may be used in all embodiments of the invention instead of otherwise determining appropriate responses from transducers.

In the illustrated device of FIG. 2, in haptics configuration, the control circuit 26 is configured to provide haptic response signals to two of the transducers 21 and 23. This is schematically illustrated by the two signal lines output from control circuit 26 to signal processing circuitry 27. These may be considered the primary signals.

In general terms, for the provision of haptic feedback or a haptic output of some kind, the signal processing circuitry 27 is configured to obtain the signals from the haptics control circuit 26 and to process them to provide an additional signal to be applied to transducer 22 in order to produce a secondary or side effect. Thus signal processing circuitry performs the function of a matrix decoder converting N signals intended for haptics control (in this example N=2) to produce an additional M transducer channel (in this example M=1). It is particularly convenient for the signals for the respective transducers to be generated in this way since the basic haptics control circuit 26 can be used in other implementations of vibratory device where the secondary effect is not required. In general terms the control circuit 26 generates signals for some of the transducers to produce a desired or primary effect and the circuit 27 uses those signals to generate one or more signals for one or more further transducers to produce a secondary or side effect. This opens up the possibility of replacing the circuit 27 if a different secondary effect is to be provided. It is convenient from the point of view of signal processing to produce the secondary effect without encoding it into the original signals provided for the desired or primary effect. For example, a dedicated control chip could be used to provide the signals for the transducers 21 and 23. This chip may or may not include the functions of the components 24 and/or 25. In an alternative implementation of the circuitry shown in FIG. 2, the functions of the signal processing circuitry 27 could be incorporated into the controller 26, for example as an additional digital signal processor. In the illustrated example the signal processing circuitry 27 is shown as a separate item. It could be incorporated into another part of the circuitry of the device. For example if the purpose of the additional channel is to provide acoustic cancellation, and the device additionally has circuitry for generating audio signals (e.g. an audio block), the function of signal processing circuitry 27 could be incorporated into that circuitry.

FIG. 2 shows an example with two transducers 21 and 23 dedicated to the primary or desired effect and one transducer 22 for the side effect. This can be scaled up and N transducers can be dedicated to the primary effect with M transducers being provided for the secondary effect, N and M being greater than or equal to 1.

Figure 3:
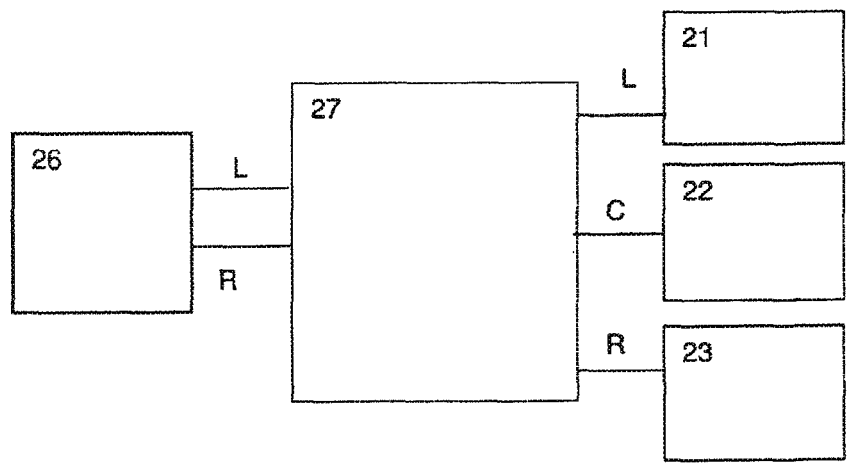
FIG. 3 is an enlarged view showing schematically only the control circuit, signal processing circuitry and transducers of FIG. 2.

FIG. 3 is an enlarged view showing schematically only the control circuit 26, signal processing circuitry 27 and three transducers 21, 22 and 23, receiving respective control signals designated L, R and C for left, right and centre. Circuitry 27 receives as inputs signals L and R intended to control transducers 21 and 23, and these are processed in circuitry 27 to generate three signals L, R and C to control transducers 21, 22 and 23 respectively. Thus circuitry 27 receives inputs on two channels and provides outputs on three channels for respective transducers.

In the example of providing haptic feedback, the extra channel can be used for audio balancing whilst avoiding any additional load on the haptics control circuit 26.

Consider a simple example of audio balancing in a three transducer arrangement as shown in FIG. 2. Assume that transducers 21 and 23 are provided equidistant from and near to respective edges of the vibratory panel and receive drive signals for providing haptic feedback. The vibratory panel is rectangular and the transducers are centred between the transverse edges of the panel, so that for the purpose of this explanation only one dimension needs to be considered. The transducers 21, 23 receive respective signals from the haptics control circuit 26 via the signal processing circuitry 27. These signals cause the transducers to generate surface waves or bending waves in the panel 20. The phases of the signals applied to the transducers are controlled in order to influence the point on the panel where the waves constructively interfere and hence the point at which the haptic feedback is "felt".

In this example signals are applied to the additional transducer 22 in order to cancel or at least reduce any acoustic output accompanying the haptic feedback.

As noted in connection with the discussion of FIGS. 1(*a*)-(*d*), in order to achieve reduction of any acoustic signal accompanying the haptic feedback, the additional transducer should be controlled to reduce the net displacement of the panel.

If the displacement of the panel at an instant in time caused by transducers 21 and 23 is represented by A and B respectively, then the displacement D of the panel caused by transducer 22 should satisfy the equation:

$$D=-(A+B)/2$$

With suitable positioning of the transducers as explained below, it can be arranged that to achieve suppression of monopole and hence maximum acoustic reduction, the relationship between the signals is $$C=-(L+R)/2$$

Figure 4:
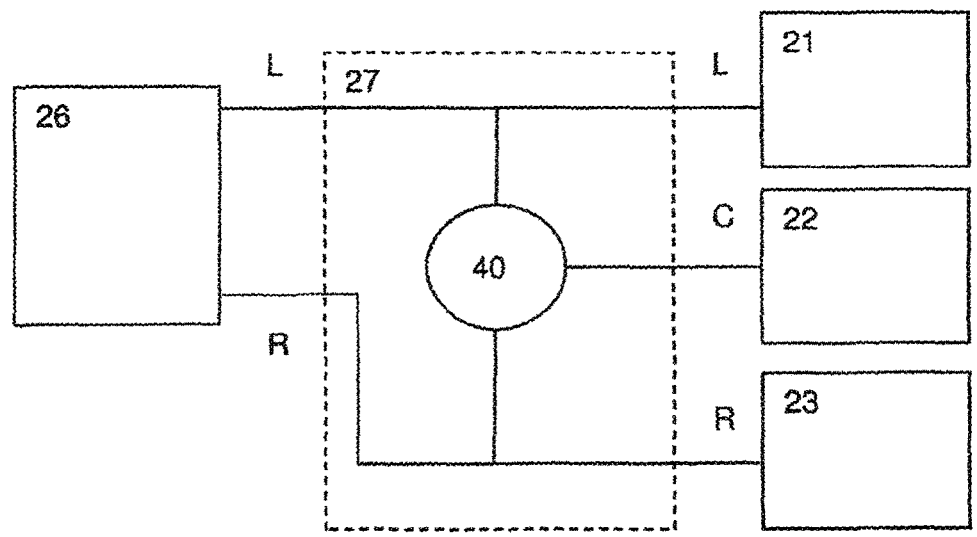
FIG. 4 shows an arrangement in which the drive matrix takes the form of a simple summing amplifier.

It follows from the above that for only three transducers in total, the matrix decoding function of circuitry 27 can be as simple as a summing amplifier. This is shown in FIG. 4 where the same reference numerals as in FIGS. 2 and 3 are used to denote the same items. As shown in FIG. 4, signal processing circuitry 27 receives signals L and R for transducers 21 and 23. These are subject to straight through processing and also fed to summing amplifier 40 which generates signal C for transducer 22.

If the amplitudes of L and R are equal, then so is the amplitude of C. Therefore the amplitudes of all of the signals are similar. This means that transducers 21, 22 and 23 can be identical in construction, which results in simple and cost effective circuitry.

The above principle could be used in reverse if the purpose of the transducers 21 and 23 was to generate audio signals. The C channel could then be used to reduce any unwanted haptics effects that might result from audio signals generated by signals applied to transducers 21 and 23. The relationship between the signals would be governed by equation (1) above, with L, R and C representing haptic signals rather than audio signals.

In audio signal generation, the additional channel feeding transducer 22 could alternatively be used to boost the audio signal. In this situation the aim would be to maximise the displacement of the panel. At the same time it is desirable as noted above for the magnitudes of the signals applied to the transducers L, R and C to be the same or of a similar order so that identical transducers can be used. With suitable positioning of the transducers as explained below, for audio signal generation it can be arranged that:

$$C=(L+R)/2.$$

Again this can be achieved with a simple summing amplifier in signal processing circuitry 27, this time with no signal inversion.

In this example the signal C could be used to make the overall sound louder. The result of applying the signal C would be more amplification at low frequencies, especially for stereo. This could be particularly useful. For some implementations the signal C could be passed through a low pass filter so that it would apply at low frequencies only. This would not harm the haptics effects since these are low frequency anyway.

Figure 5:
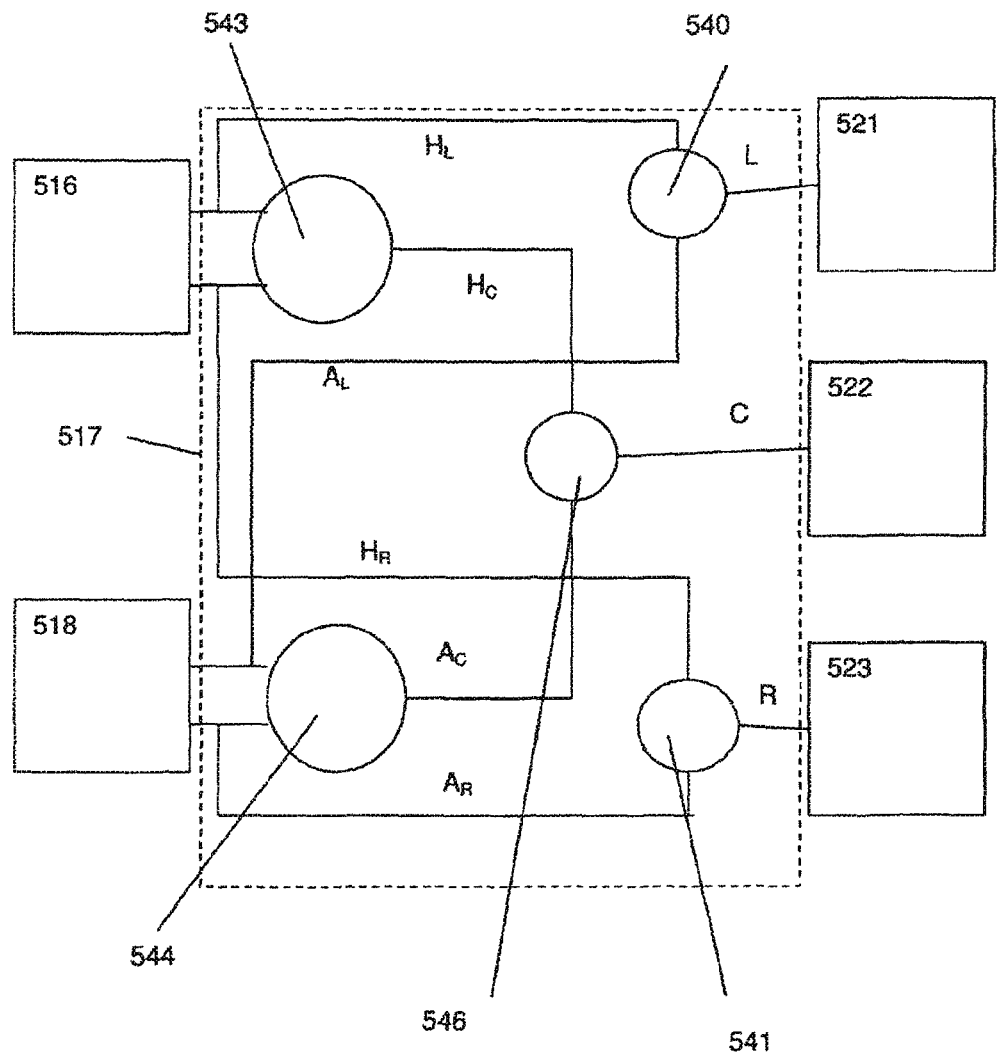
FIG. 5 illustrates the provision of signals to transducers used for haptic feedback as well as audio signal generation.

In the foregoing it has been assumed that the vibratory panel device is controlled to provide haptic feedback or audio signals. However, the vibratory panel device shown in FIG. 2 can be configured to provide audio signals as well as haptic feedback. This can be achieved using separate transducers dedicated to the purpose of audio signal generation. However it is possible for the same transducers to be used for both audio signal generation and the provision of haptic feedback. FIG. 5 illustrates the provision of signals to transducers in this situation.

In FIG. 5, three transducers 521, 522 and 523 are controlled by signals denoted L, R and C for left, right and centre. Haptics control circuit 516 operates in the same way as circuit 26 in the previous examples providing signals denoted $H_L$, $H_R$, for the left and right transducers 521 and 523 respectively. These signals are supplied to modified signal processing circuitry 517. This is similar to signal processing circuitry 27 but is configured to process additional signals. Thus FIG. 5 shows an audio control block 518 which operates to generate signals $A_L$, and $A_R$ for respective transducers 521 and 523 for use in the generation of audio signals from the panel 20. These signals $A_L$, and $A_R$ are additionally supplied to signal processing circuitry 517. Within signal processing circuitry 517, signals $A_L$ and $H_L$ are passed straight through to summing amplifier 540. Similarly signals $A_R$ and $H_R$ are passed straight through to summing amplifier 541.

Signals $H_L$ and $H_R$ are supplied to first matrix decoder 543 which generates signal $H_C$. Signals $A_L$ and $A_R$ are supplied to a second matrix decoder 544 which generates signal $A_C$. Signals $H_C$ and $A_C$ are supplied to summing amplifier 546.

Signals $H_L$ and $A_L$ may be simply summed in summing amplifier 540 to form signal L to be applied to transducer 521. Signals $H_R$ and $A_R$ may be simply summed in summing amplifier 541 to form signal R to be applied to transducer 523. Signals $H_C$ and $A_C$ may be simply summed in summing amplifier 546 to form signal C to be applied to transducer 522.

It follows from the foregoing that in one implementation of circuit 517 matrix decoder 544 functions as follows:

$$A_C = -(A_R + A_L)/2$$

This formula is appropriate if the intention of circuit 517 is to reduce any haptic effect that may result as a side effect of the audio signal generation.

Alternatively if the central transducer 522 is to be used to boost the audio signal, then matrix decoder may function as follows:

$$A_C = -(A_R + A_L)/2.$$

In both cases, as with the summing amplifier 540, the matrix decoder 544 as well as the matrix decoder 543 may be a simple summing amplifier.

Figure 6:
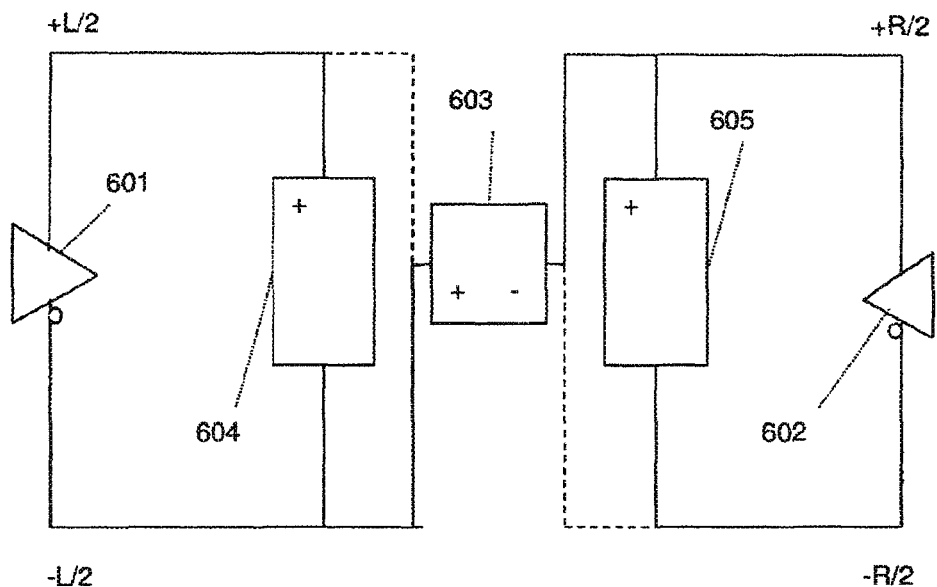
FIG. 6 shows a drive circuit using push-pull amplifiers.

In an alternative implementation the inputs for the transducer 522 can be derived from a simple circuit using push-pull amplifiers as shown in FIG. 6. This figure shows an audio circuit where transducers 604 and 605 function similarly to right and left speakers in a stereo system. Here, the signals L and R for the right and left transducers respectively are supplied to respective push-pull amplifiers 601 and 602 which output signals +L/2, −L/2, +R/2 and −R/2. These signals are supplied to respective inputs of a transducer 603 according to the desired output C.

Thus if $$C=(L+R)/2$$

is required, e.g. for audio boosting, +L/2 is supplied to the non-inverting input of transducer 603 and −R/2 is supplied to the inverting input. This is shown in dotted lines in FIG. 6.

if $$C=-(L+R)/2$$

is required, e.g. for cancellation, −L/2 is supplied to the non-inverting input of transducer 603 and +R/2 is supplied to the inverting input. This is shown in solid lines in FIG. 6.

The signals +L/2, −L/2, +R/2 and −R/2 are supplied directly to the respective transducers 604, 605.

Figure 7:
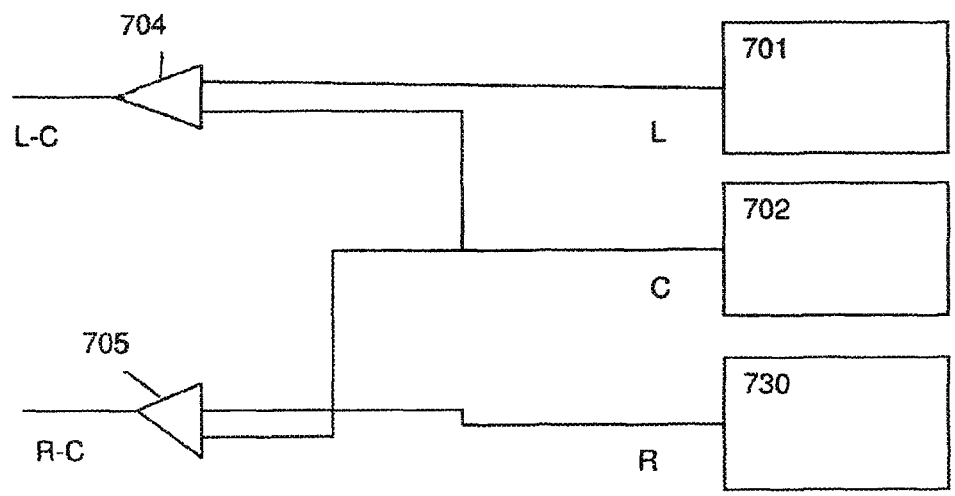
FIG. 7 shows an example of a drive circuit for use where the vibratory panel is to sense vibrations, such as touch or audio signals.

The foregoing examples all discuss implementations where the vibratory panel is to generate vibrations, such as a haptic response or audio feedback. The general principle of using one or more additional channels as discussed above is applicable to implementations where the vibratory panel is to sense vibrations, such as touch or audio signals. FIG. 7 shows one example.

in FIG. 7, signals L, C and R from respective transducers 701, 702 and 703 are supplied to differential amplifiers 704 and 705 to output signals L-C and R-C respectively. This arrangement can be used in touch sensing for example to reduce common mode effects such as whole body vibrations, of the kind a device might experience when travelling on a train. The signal from the centre channel is effectively eliminated.

For audio sensing there are situations in which signals from the centre transducer are desired. For example this will be more sensitive to low frequency vibrations. Thus all three signals L, C and R might be used to reproduce a sensed audio signal.

Figure 8:
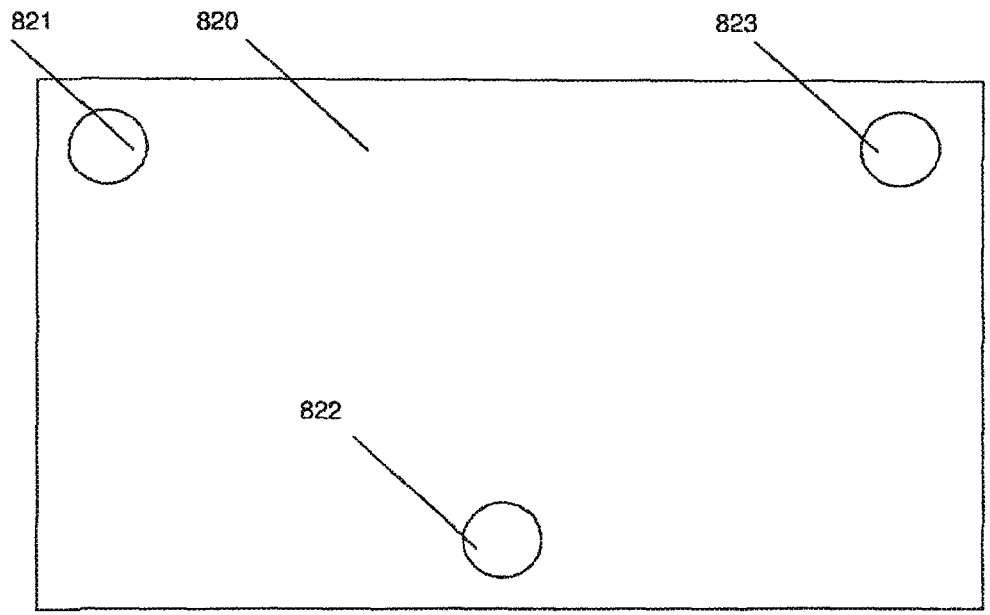
FIG. 8 is a schematic diagram of a vibratory panel with three transducers.

The foregoing explanation has considered only vibrations in one dimension. In a practical situation other modes of vibration of the panel will be induced and bending components in the orthogonal direction also need to be taken into account. Therefore in a simple three transducer arrangement where the panel needs to be considered in two dimensions, rather than simply as a beam, it is desirable for the N transducers and the additional M transducer to be positioned adjacent opposite edges of the panel. The reason for this will become clear in the following discussion of optimisation of position. A possible arrangement of transducers is shown in FIG. 8. Here a panel 820 has transducers 821 and 823 positioned at opposite ends of one of the longitudinal edges and a further transducer 822 positioned at the centre of the opposite edge.

Transducer 822 may be used to reduce or compensate for any audible vibrations that result from haptics signals applied to transducers 821 and 823. More generally, a signal applied to transducer 822 may be derived from signals applied to transducers 821 and 823 to produce an effect that is secondary to the effect produced by transducers 821 and 823.

Figure 9:
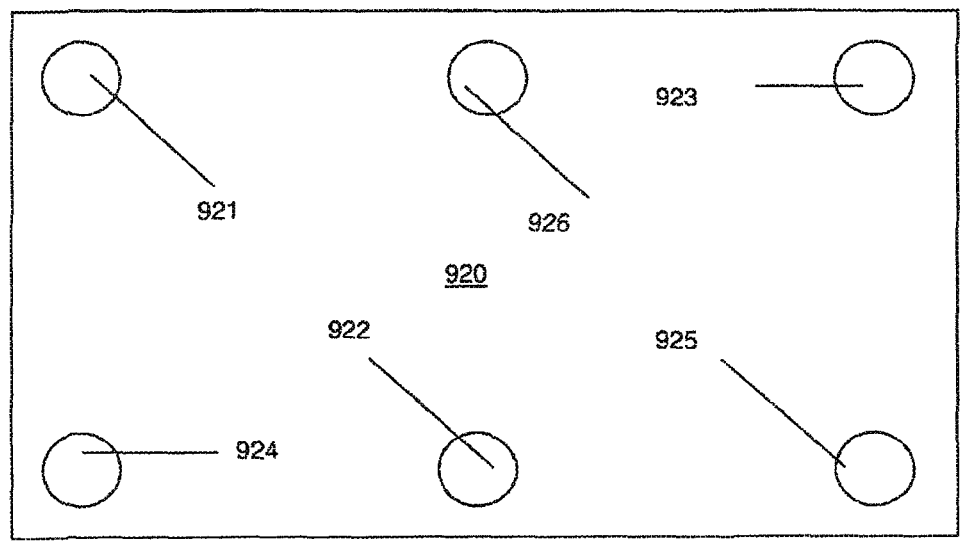
FIG. 9 is a schematic diagram of a vibratory panel with six transducers.

The foregoing examples consider only arrangements of three transducers but the same principles can be applied to arrangements including more transducers. An arrangement including six transducers is shown in FIG. 9. Here a signal to be applied to transducer 922 is derived from signals applied to transducers 921 and 923 which are at the opposite edge of the panel 920. Similarly a signal to be applied to transducer 926 is derived from signals applied to transducers 924 and 925.

The two central transducers 926 and 922 of FIG. 9 may be replaced with a single transducer at the centre of the panel midway between the positions of transducers 926 and 922. Consider for example a panel with transducers at its corners having drive strengths $L_U$, $R_U$, $L_L$ and $R_L$. For this arrangement in order to achieve audio cancellation the signal C would have amplitude:

$$C=-\tfrac{1}{4}(L_U+R_U+L_L+R_L).$$

Optimisation of Transducer Parameters
General Considerations

Many current applications of vibratory panels use transducers in the form of piezoelectric motors operated inertially. In the following we are considering drive mode and hence they are referred to as exciters. However the discussion applies equally when the transducers are used in sensing mode and therefore references to "exciters" can be replaced with references to "sensors". It should be noted here that piezoelectric materials are lossy and the signal they provide is transient. Therefore, strictly speaking, this transient signal is analysed in order to provide information on applied force, for example. Thus "sensing" in the context of lossy transducers is intended to cover the analysis of a transient signal.

Often the design of the device in which transducers are used constrains their placement. However when the designer has a choice of where to place them the performance of the panel can be enhanced by suitable placement. Possible goals in device design are to maximise the deflection over the entire panel and to avoid dead spots. Others are to simplify the drive circuitry, for example by driving all exciters with the same or similar voltage amplitudes.

Initial investigations considered maximising the mean displacement as simulated at each corner of a panel quadrant as a first goal and minimising the standard deviation of the same data as a second goal. The ratio of standard deviation to mean displacement is a convenient measure to aim to minimise. Because the deflection of a mounted panel at specific test points may generally be much larger than at any other test points, data for the former can dominate results. Therefore the measurement for each point can be pre-scaled by the maximum value achieved over the search space for that point so that each point contributes equally to the statistics.

Simulations show that the ratio varies with position of the exciter along the edge of the panel and therefore a panel can be provided with transducers positioned to minimise the ratio of standard deviation to mean displacement. It can also be shown that replacing one exciter with two has a marked effect on the displacement field, i.e. the distribution of displacement of points on the panel in response to excitation of the transducer(s).

An alternative statistic that may be used to characterise the displacement field is the dB ratio of maximum displacement to minimum displacement over a set of test points.

Many current designs of vibratory panel devices are constrained by the fact that the exciter is visible through the panel, e.g. touch screen. These devices have a separate liquid crystal display behind the touch screen and the exciters. Therefore there is a tendency to position the exciters at the edge of the touch screen where they will least interfere with information being displayed on the touch screen.

A simple example of optimising the placement of transducers to simplify circuit design will now be explained referring back to FIGS. 1 to 5.

It was mentioned above in connection with FIGS. 2 to 5 that in order to achieve a situation where the formula $$C=-(L+R)/2$$

is applicable, suitable positioning of the transducers is required. This is partly because in practice the panel will usually be mounted at its edges and therefore greater displacement is possible at the centre of the panel than at the edges. Consider again the one dimensional example of a beam supported at its ends.

In monopole vibration it can be assumed that the displacement y of the panel at position x from the edge of the panel when driven by a point force F is defined by the equation:

$$y = \frac{F}{k}\sin\left(\frac{\pi \cdot x}{L_x}\right)$$

where $L_x$ is the length of the beam, and k is a characteristic stiffness of the panel which is here assumed independent of x or F.

In other words the panel adopts a sinusoidal shape.

The aim in cancelling acoustic vibrations is to ensure that the overall displacement is minimized. Put mathematically, it is desirable that:

$$\frac{L}{k}\sin\left(\frac{\pi \cdot x_L}{L_x}\right) + \frac{C}{k}\sin\left(\frac{\pi \cdot x_C}{L_x}\right) + \frac{R}{k}\sin\left(\frac{\pi \cdot x_R}{L_x}\right) = 0$$

Where $x_L$, $x_C$ and $x_R$ represent the locations of the L, C and R exciters, respectively.

Referring to FIG. 1d and the associated description, the overall displacement of the panel may be minimised when the transducers are driven appropriately. In this case the transducers driven by the L, R, and C control signals are positioned distances $x_L$, $x_C$ and $x_R$ from one end of the beam, where the additional transducer is positioned in the middle of the beam. This means that $$\frac{L}{k}\sin\left(\frac{\pi \cdot x_L}{L_x}\right) + \frac{C}{k} + \frac{R}{k}\sin\left(\frac{\pi \cdot x_R}{L_x}\right) = 0 \text{ Or}$$

$$C = -\left(L\sin\left(\frac{\pi \cdot x_L}{L_x}\right) + R\sin\left(\frac{\pi \cdot x_R}{L_x}\right)\right)$$

As discussed above in order to achieve maximum acoustic reduction, the relationship between the signals is $C=-(L+R)/2$ which substituted in the foregoing equation gives the result that $$x_L = \frac{L_x}{6} \text{ and } x_R = \frac{5L_x}{6}$$

so with the L and R transducers positioned one sixth of the length of the beam from the end with the C transducer positioned at the centre of the beam, it can be arranged that the amplitudes of the signals (i.e. drive strengths) for the three transducers in order to cancel the monopole and hence achieve acoustic reduction could be equal. As noted above this is particularly desired since it simplifies the circuit design required for implementation of the acoustic reduction. The foregoing does not take account of the constraints on beam displacement caused by the mounting. However if the beam is simply constrained at each of its ends it will still adopt a sinusoidal shape and therefore the above formula still applies.

The foregoing solution where the outer transducers are one sixth in from the end and the additional transducer is half way along the beam is not the only solution. There are solutions for the equation (=zero) with symmetrical arrangements of the two outer transducers closer to the ends than the ⅙ position. This then requires that the additional transducer is off centre.

Similar considerations apply to the arrangements of FIGS. 8 and 9. Ideally if the product design permits, the transducers shown at the corners of the panels should be placed one sixth of the distance along the longitudinal edges of the panels with the additional transducer in the centre.

Use of Grounded Exciters

Looking to the future, the currently separate LCD and touch screen may be replaced with a combined touch sensitive OLED (organic light emitting display). It may then be possible to vibrate the whole combined touch screen and display. The exciters could then be positioned behind the OLED where they are not visible. The designer then has more freedom of choice of position and size of exciters. Furthermore, the inertial transducer as exciter may be replaced with a layer of piezoelectric material that is fully attached to and optionally covers the whole of the surface of the composite panel. Such a transducer is in effect grounded rather than inertial.

Examples of possible layer structures are now described.

Figure 10:
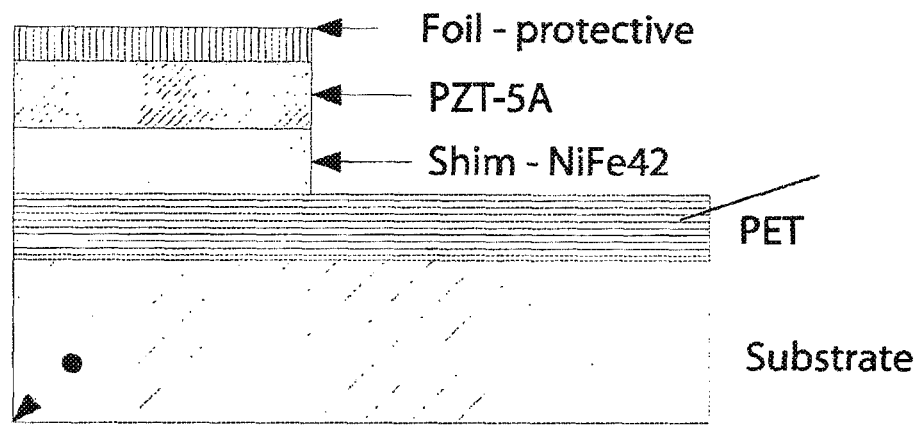
FIG. 10 shows the construction of a unimorph piezoelectric bender.

FIG. 10 shows a model of a unimorph structure on a panel. The structure comprises the panel as substrate 100 (typically polycarbonate, or glass such as "gorilla glass" from Corning, or any other suitable material), PET layer 101 (a type of plastics material forming part of the panel), shim 102, PZT (or any other electrically active) layer 103 and foil layer 104. In a practical arrangement the substrate 100 may include an OLED layer. This construction relies on the stiffness of the substrate to provide a resisting force, which results in the panel bending.

Figure 11:
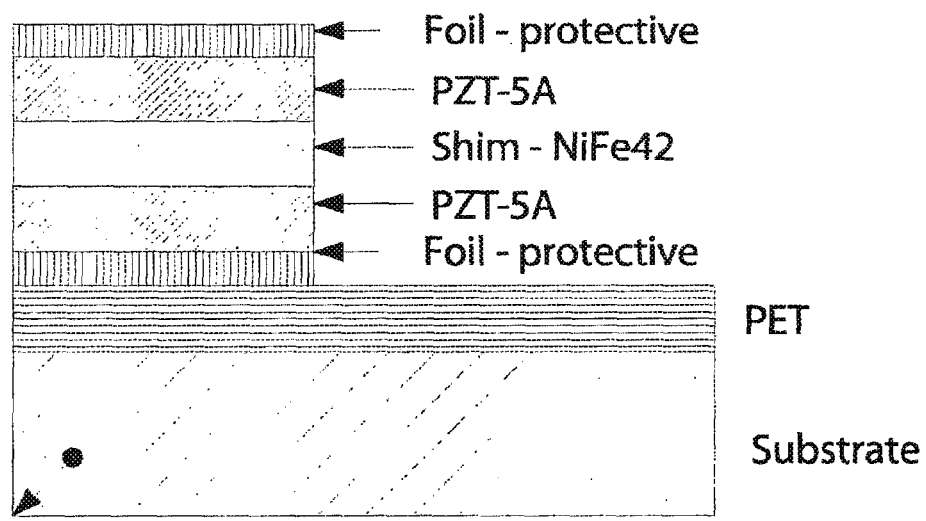
FIG. 11 shows the construction of a bimorph piezoelectric bender.

FIG. 11 shows a bimorph structure in which a shim is sandwiched between two layers of piezoelectric material. The structure comprises substrate 110 (which may include OLED layer), PET layer 111, first foil protective layer 112, first piezoelectric layer 113, shim 114, second piezoelectric layer 115 and second foil protective layer 116. With this construction, the two piezoelectric layers act in push-pull, which results in the panel bending.

Various known possibilities exist for the attachment of the piezoelectric material to the substrate including forming piezoelectric layer and electrodes in a separate assembly that is attached to the substrate, for example with appropriate adhesive. Alternatively the piezo assembly could be co-formed with the substrate. This would require elevated temperatures and would require glass or metal for the substrate. A lower temperature process might be available for non-ceramic layers such as electrically active polymers.

It will be appreciated that the layered structure of the exciter will need to be chosen to match the properties of the panel to which it is laminated and the foregoing are simple examples. However they are useful for modelling the possible responses of the panel to various shapes of exciter.

It now becomes possible to experiment with a wide range of shapes and sizes of exciter and to accommodate any number of transducer channels. Thus the laminated structure lends itself well to the provision of the M additional channels discussed above.

In the following various shapes of exciter are explored, based on a unimorph structure. Nevertheless the design principles to be explained are applicable also to a bimorph structure. It will be appreciated that these shapes can either be achieved through patterning of the piezoelectric material itself or through the use of patterned electrodes. With patterned electrodes, the piezoelectric material could form a continuous layer over the whole of the surface of the panel. Thus the following examples unless otherwise stated are applicable to uni- and bi-morph structures and to the piezo and/or electrode material being patterned.

Three Electrodes for Minimising Acoustic Radiation

It will be clear from the foregoing that three is the minimum number of inputs that allows simultaneous minimisation of pressure (which might produce an audible response) and steering of haptics. In a symmetrical arrangement of electrodes, for example left-centre-right, it is clear that a 1, 0, −1 drive arrangement generates no on-axis pressure. Here the outer exciters are driven in anti-phase and there is no drive to the central exciter. This is equivalent to the two channel anti-phase arrangement shown in FIG. 1(c). However with three channels, there is also a "x, −y, x" arrangement that has no net displacement. Here the two outer exciters are in phase and the central exciter is out of phase with them as shown in FIG. 1(d).

It was found from experiments that with a simple division of a rectangular panel into 3 equal divisions, i.e. three equal electrodes, to achieve no net displacement the drive strengths x and y were almost equal in value, effectively meaning that the centre channel was twice as active as the L and R channels.

If the reason for this could be explained, it might then be used to predict other arrangements of electrodes that might be of interest. This is explored below initially using a beam model for simplicity, extending this to an area integrated model, and then verifying this using a finite element model.

Beam Model

Implicit drive of a beam introduces a predictable distribution of moments that allows explicit solution of the static bending equation. Assume a simply-supported beam with 3 electrodes symmetrically energised as (1, −1, 1), and assume that the moment generated is directly proportional to the length of the electrode. If the length of the beam is normalised to 1, and the three electrodes are positioned such that the gaps between the electrodes are at positions along the beam equal to a, and 1−a, then the model suggests:

$$\frac{d^2 zs(x)}{dx^2} = M_x \cdot x, \; 0 \le x \le a \quad (1)$$

$$\frac{d^2 zs(x)}{dx^2} = -M_x \cdot (1 - 2 \cdot a), \; a \le x \le 1 - a \quad (2)$$

$$\frac{d^2 zs(x)}{dx^2} = M_x \cdot (1 - x), \; 1 - a \le x \le 1 \quad (3)$$

$$zs(x) = zs(1 - x), \; 0 \le x \le 1 \quad (4)$$

where zs represents the symmetric displacement field due the (1, −1, 1) energising of the electrodes.

Integrating these formulae, setting $M_x=1$ and asserting continuity at the boundaries gives simple polynomial solutions for the displaced shape:

$$zs(x) = x3/6 + a \cdot (2 \cdot a2 - 4 \cdot a + 1) \cdot x/2 \; 0 \le x \le a \quad (5)$$

$$zs(x) = (a - 1/2) \cdot x \cdot (1 - x) + a4 - 17/6 \cdot a3 + 2 \cdot a2 - a/2 \; a \le x \le 1/2 \quad (6)$$

From these functions it is possible to calculate the mean displacement as a function of a, and then find the value of a which makes it zero.

$$\mu = \quad (7)$$

$$\int_0^1 zs(x) dx = (1 - a) \cdot (3 \cdot a - 1) \cdot (4 \cdot a^3 - 11 \cdot a^2 + 4 \cdot a - 1)/12 = 0,$$

$$a = 1/3$$

the result of which is a=⅓.

This means that the two gaps between the three electrodes are at a position ⅓ and ⅔ the way along the beam, with the centre points of the three electrodes then being ⅙, ½, and ⅚ the way along the beam.

A similar function of x may also be formulated that satisfies the antisymmetric (1, 0, −1) drive arrangement. The mean displacement of this will always be zero whatever the value of a. The symmetric and antisymmetric shapes are shown in FIGS. 1(d) and (c) respectively.

$$za(x) = \frac{x}{6} \cdot (x^2 + a^2 - a) \quad (8)$$
$$0 \le x \le a$$

$$za(x) = \frac{a}{6} \cdot \frac{2 \cdot x - 1}{2 \cdot a - 1} \cdot (x^2 + a^2 - x) \quad (9)$$
$$a \le x \le 1/2$$

Any linear combination of the two shapes shown in FIGS. 1(d) and 1(c) will have a net zero displacement.

Area Integrated Model

For a 2-dimensional panel, there is no simple solution like the one for the beam, especially for arbitrary patch shapes. Whilst it may be possible to formulate an infinite sum solution, a "heuristic" approach was tried as follows.

If we consider the simplest mode-shape for a simply-supported panel and use this as a weighting function, using normalised dimensional co-ordinates we get:

$$W = \frac{\pi^2}{4} \cdot \int_0^1 \int_{x_{max}(y)}^{x_{max}(y)} \sin(\pi \cdot x) \cdot \sin(\pi \cdot y) dy \, dx \text{ where} \quad (10)$$

$$0 \le W \le \frac{\pi^2}{4} \cdot \int_0^1 \int_0^1 \sin(\pi \cdot x) \cdot \sin(\pi \cdot y) dy \, dx = 1 \quad (11)$$

For a rectangular arrangement partitioned at a and 1−a, we look for $$W = \frac{\pi^2}{4} \cdot \int_0^1 \int_a^{1-a} \sin(\pi \cdot x) \cdot \sin(\pi \cdot y) dy \, dx = \cos(\pi \cdot a) = 1/2 \quad (12)$$

So again, a=⅓ is the solution.

Using the same idea, it is possible to investigate many different electrode divisions. With straight line cuts. i.e. boundaries between electrodes or edges of electrodes, the integral (10) may be evaluated directly. With other cuts, numerical methods may be needed.

Figure 12:
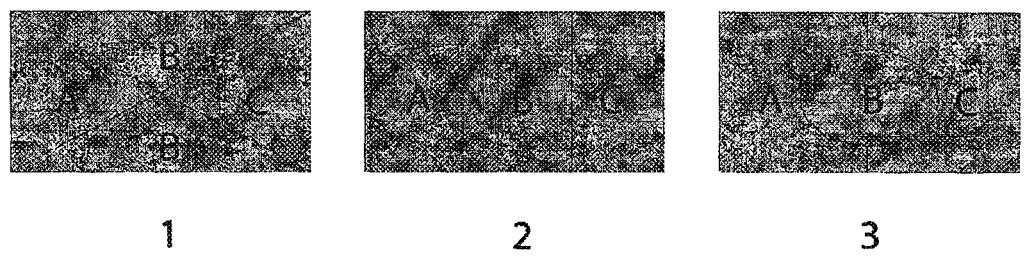
FIG. 12 shows a number of possible geometries for a panel with three drive channels.

For example, consider a circle (or ellipse) co-centred with the panel as shown in FIG. 12 (3). In this case, it is convenient to shift the origin of the co-ordinate system by (½, ½), so equation (10) becomes $$W(r) = \pi^2 \cdot \int_0^r \int_0^{\sqrt{(r^2 - x^2)}} \cos(\pi \cdot x) \cdot \cos(\pi \cdot y) dy \, dx \quad (13)$$
$$0 \le r \le 1/2 \text{ or}$$

$$W(a, b) = \pi^2 \cdot \int_0^a \int_0^{b \cdot \sqrt{(1 - x^2/a^2)}} \cos(\pi \cdot x) \cdot \cos(\pi \cdot y) dy \, dx \quad (14)$$
$$0 \le a, b \le 1/2$$

Integral (14) may be partially evaluated, thus $$W(a, b) = \pi \cdot \int_0^a \cos(\pi \cdot x) \cdot \sin(\pi \cdot b \cdot \sqrt{(1 - x^2/a^2)}) dx \quad (15)$$

The value of r required for (13) to evaluate to ½ is about 0.281. (An axisymmetric analogue to the beam model gives a value that ranges between 0.24 and 0.32, depending on Poisson's ratio.)

Finite Element Model

In an attempt to estimate the usefulness of the theoretical models for predicting electrode sizes, a finite element (FE) model of a typical system was produced. The model had a 0.8 mm glass panel of 120 mm by 80 mm, laminated to a 38 um layer of ceramic piezoelectric material, a Poron® sealing gasket, and an internal air-space that was only 0.5 mm thick over the majority of the panel area. The model was bi-laterally symmetrical, which means that the model was 2D, symmetrical in both X and Y axes, as shown for example in FIG. 12. Although the panel is not simply-supported, it is approximately so at low frequencies.

The precise division of the electrodes was varied between model runs, but there were always 3 electrodes. Electrodes A and C formed a symmetrical pair, and electrode B was the centred electrode, as shown for example in FIG. 12(2). The condition of zero net displacement was determined by looking for zero simulated internal pressure at a node located at the centre of the panel.

For the first example of simple rectangular electrodes as shown in FIG. 12(2), the value of the first gap between electrodes a was found to be 0.341, which is very close to the estimated value of ⅓.

For the second example of elliptical electrodes, it should be noted that a circle in normalised co-ordinates corresponds to an ellipse with a:b=3:2 in the FE model. Modelling with an ellipse or a circle produced very similar results; the ellipse corresponded to a circle whose normalised radius was 0.225, and an actual circle had a relative radius (given by radius/sqrt(120×80)) of 0.228.

The foregoing techniques may be used to explore other shapes for the electrodes. FIG. 12 shows three possible shapes that span the range of available shapes for three electrodes on a rectangular panel.

Shapes 2 and 3 were the objects of study in the earlier paragraphs, whilst shape 1 is based on the simple observation of symmetry. It is clear that whilst each arrangement supports the two modes of operation discussed in the introduction and shown in FIGS. 1(c) and (d), the relative areas of the electrodes vary immensely. In shape 1, the area of the B electrode is effectively divided into two electrodes that meet at a point at the centre of the panel. The area of the B is ½ of the panel area, i.e. double the areas of the A or C electrodes; in shape 2 the areas are all the same (B is ⅓ of the panel area); and in shape 3, the area of B is about ¼ of the panel area, i.e. about ⅔ of the area of A or C.

Looking at the intended operation as a device capable of generating tactile feedback, it would be good if there were no "no-go" areas, or nodal points. The (A, 0, −C) arrangements all tend to produce a nodal line along the symmetry line, so a design aim would be that the nodal lines generated by the (A, −B, C) arrangement did not cross this. The arrangement of FIG. 12(1) is likely to produce a nodal point at the centre as the deformation would be a saddle surface. Arrangement 3 tends to produce a closed nodal line near to, but outside of, the boundary of region B, which crosses the symmetry line at two points. For arrangement 2, the nodal lines are near the electrode divisions, and thus well away from the symmetry line. This would suggest that arrangement 2 is the best of these three. There may be a similar shape that is better or equally good. For example, possibly the three electrodes need not necessarily be separated by straight lines.

Figure 13A:
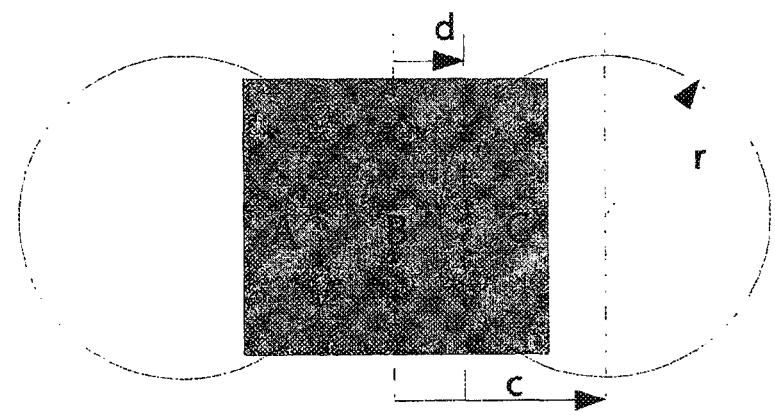
FIGS. 13a and 13b show possible three channel arrangements with curved divisions between electrodes.

Consider now a systematically related family of shapes defined by circular arcs (in the normalize co-ordinate system) as shown in FIG. 13a. The arcs have radius, r, and are centred a distance, c, from the symmetry line. The distance, d, is that of a straight line-pair that divides the area in the same ratio as the arcs. It is convenient to consider the curvature, σ=1/r, which may be positive or negative. The illustration below shows a positive example. The limiting case of σ=0 refers to a straight line at c=d.

Figure 13B:
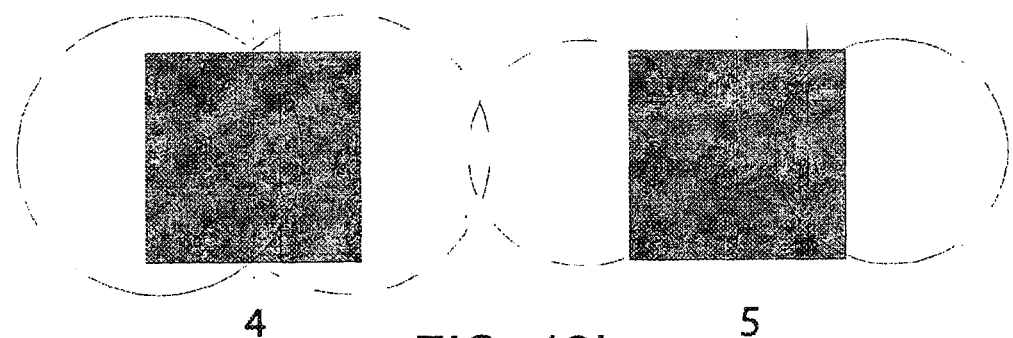

The extremes of σ that result in the arcs crossing the longer sides produce the two cases shown in FIG. 13b, where the lenticular shape of example 4 relates to the most negative curvature, and the hour-glass shape of example 5 to the most positive curvature.

The normalised area of electrode B is given simply by 2d. Using this, and the integrated area subtended by the arcs, we may write an equation that relates r, c and d, thus:

$$c = \quad (16)$$

$$\sqrt{\left(r^2 - \frac{1}{4}\right)} + 2 \cdot r^2 \cdot a\sin\left(\frac{1}{2 \cdot r}\right) + 2 \cdot d, x = c - \sqrt{(r^2 - y^2)}, 1/r > 0$$

$$\sqrt{\left(r^2 - \frac{1}{4}\right)} + 2 \cdot r^2 \cdot a\sin\left(\frac{1}{2 \cdot r}\right) - 2 \cdot d, x = c + \sqrt{(r^2 - y^2)}, 1/r < 0$$

Referring back to equations (10), (13) and (15), the aim is to achieve $$\pi \cdot \int_0^{\frac{1}{2}} \sin(\pi \cdot x(y)) \cdot \cos(\pi \cdot y) dy = \frac{1}{2} \quad (17)$$

The solution for 1/r lies very nearly on a straight line, namely:

$$\sigma = \frac{1}{r} = 55.593 \cdot \left(d - \frac{1}{6}\right) \quad (18)$$

The most obvious feature of the result (18) is that d=⅙ plays a significant role. At that value, the radius becomes infinite, and the geometry matches that of case 2, above.

Refer now to the extrema. Case 4 (FIG. 13b) has the minimum area for B, at 0.279, the maximum central separation of the electrodes, at 0.406 and the zero peripheral separation of the electrodes. The convergence of the electrodes at the symmetry line will result in a pair of nodal points. Case 5 has the maximum area for B, at 0.437, the minimum central separation of the electrodes, at 0.238, and the maximum peripheral separation of the electrodes, at 0.5.

The optimum shape for the electrodes probably lies between cases 2 (equal area rectangular electrodes) and 5 (outer electrodes with arcuate facing surfaces with maximum distance apart at the panel edge or peripheral separation), and may well depend practical aspects of the device not taken into account in these hypothetical examples.

For the three panel arrangement, the simplicity and effectiveness of three electrodes of equal area is appealing although there is clearly scope for further exploration of three electrode arrangements. The three electrode examples all used two input signals to generate a third signal, although this was not essential and the third signal could be separately derived.

The foregoing shows that having determined the number of transducers or exciters to be used, and any other constraints on a panel assembly, it is possible to determine the behaviour of a panel assembly as described above and determine values for the electrode shapes, divisions and areas based on optimising either the range of potentials to be applied (so as to simplify the drive circuitry) or the displacement field, or a combination of the two. Having determined values for the electrode parameters, it is possible to choose the drive signals for the electrodes to further improve the displacement field of the panel. The signals for the respective electrodes may be represented as a drive matrix. Thus, the drive matrix for the electrodes may be finely adjusted for best performance of the panel after appropriate parameters for the electrodes have been determined.

Clearly this principle could be extended to arrangements with more electrodes. In the following the discussion is extended to 3×3=9 electrode patterns.

Nine Electrode Arrangements

Firstly consideration is given to useful ways of driving a 3×3 array of electrodes on a direct-bender (i.e. a layer of piezoelectric material applied to a panel), and in particular the use of four input channels. For the purpose of acoustic cancellation and other analogous implementations discussed above in connection with touch sensing, haptic feedback, acoustic sensing and sound reproduction, only the monopole mode of vibration needs to be considered. All of the arrangements considered in the next section therefore resulted in the extra channels including a proportion of the monopole M.

The figures that accompany the following explanation show all of the electrodes, sometimes referred to as tiles, being square. However the discussion is applicable to rectangular electrodes unless otherwise stated.

Drive Arrangements with Equal Area Electrodes

Using what was learned from the above, particularly the layout of FIG. 12 example 2, we may assign voltages to 8 of the 9 electrodes. Extending the 1-D (2-channel) solution to 2-D gives the arrangement of FIG. 14 where the signal applied to the edge electrodes is equal and opposite to the sum of the adjacent corner electrodes, for example to achieve "quiet" haptics, i.e. zero net displacement of the panel or zero pressure. Clearly, we have a spare electrode, but we already have a zero-sum.

If it is assumed that each electrode has an equal effect on the average displacement, then anything added at the centre must be removed from the other electrodes, as shown in FIG. 15. The question then is what is the best value for X? One possibility would be for X to be chosen so as to minimize an energy cost function of the device.

The sum of the electrode potentials FIG. 15 can be represented as:

$$M = A+B+C+D+X - (2 \cdot A+2 \cdot B+X)/4 - (2 \cdot A+2 \cdot C+X)/4 - (2 \cdot B+2 \cdot D+X)/4 - (2 \cdot C+2 \cdot D+X)/4 \quad (19)$$

i.e. M=0.

The sum of the squared electrode potentials is one possibility for an energy cost function that could be minimized. This is represented as:

$$E = A^2 + B^2 + C^2 + D^2 + X^2 - \quad (20)$$
$$(2 \cdot A + 2 \cdot B + X)^2/16 - (2 \cdot A + 2 \cdot C + X)^2/16 - $$
$$(2 \cdot B + 2 \cdot D + X)^2/16 - (2 \cdot C + 2 \cdot D + X)^2/16$$

$$E = 5 \cdot X^2/4 + (A+B+C+D) \cdot X/2 + \quad (21)$$
$$3 \cdot (A^2 + B^2 + C^2 + D^2)/2 + (A+D) \cdot (C+B)/2$$

$$\frac{dE}{X} = 5 \cdot X/2 + (A+B+C+D)/2 = 0, \quad (22)$$
$$X = -(A+B+C+D)/5,$$

This result may at first sight be slightly surprising, as it might be expected that X should be 0 or the negative of the mean, i.e. −(A+B+C+D)/4, but it makes more sense when we consider the four fundamental arrangements of A, B, C, and D.

Just as the fundamental arrangements of a 2-channel L/R system were L+R and L−R, the four-channel system has the four MDQ combinations.

M=monopole=A+B+C+D;

D=dipole, of which there are 2, =A+B−C−D and A−B+C−D;

Q=quadrupole=A−B−C+D.

Only the M set has a non-zero sum, so from here on it is the main object of attention. If we set A=B=C=D=1, then the arrangement of potentials looks like FIG. 16. Using equation (22), X and all the remaining potentials equal −⅘. Any other value of X would result in the centre patch being at a different potential from the other 4 (for example if X=0 or −1, the four are all at −1 or −¾).

In the foregoing it has been assumed that each electrode is the same size and has the same activity (net displacement per volt applied). Activity can be calculated and/or modeled by integrating the displacement over the area of the electrode. However it is often sufficient simply to consider the relative activity of one electrode compared to another. Equal areas and equal activities are unlikely to be present in practice. For a mounted panel, in an arrangement in which electrodes have equal areas it is unlikely that the electrodes will have equal activities. As noted above at the very least the centre electrode is likely to be more active than those at the edges.

Different Areas

If each electrode patch has a different area, for example as a result of being arranged for all patches to be equally active, then we may want to reconsider the optimum choice for X. If our device is piezoelectric, it is likely that the capacitance, and hence the current, is proportional to the area. The non-uniformity of current means that the energy sum changes.

Let us assume a symmetrical arrangement of electrodes, such that the four corner patches are of equal area S1, the upper and lower mid-side patches are of area S2, the left and right mid-side patches are of area S3, and the centre patch is of area S4.

If we wish to minimise the electrical energy, then E is proportional to the voltage V multiplied by the current I. Furthermore for an assumed alternating voltage, the current I is proportional to the capacitance C multiplied by the voltage V. And because the capacitance C is likely to be proportional to the Area, then the electrical energy E may be considered to be proportional to=$V^2$ multiplied by Area. This is in contrast to $V^2$ as in the above example. Therefore, this can be represented as:

$$E_{VI} := \sum_{i=1}^{9} V_i^2 \cdot Area_i \quad (23)$$

$$X := -(A+B+C+D) \cdot \frac{1}{1 + 8 \cdot \frac{S4}{S2+S3}}$$

Alternatively, if the energy drain depends more on the current than on the voltage, then because the electrical energy E is proportional to current $I^2$, and current I is proportional to the capacitance C multiplied by the voltage V, and the capacitance is proportional to the area, then the electrical energy E is proportional to $V^2$ multiplied by the Area$^2$. This can be represented as:

$$E_{VI} = \sum_{i=1}^{9} V_i^2 \cdot Area_i, \quad (24)$$

$$X = -(A+B+C+D) \cdot \frac{1}{1 + 8 \cdot S4/(S2+S3)}$$

$$E_{VI} = \sum_{i=1}^{9} V_i^2 \cdot Area_i^2, \quad (25)$$

$$X = -(A+B+C+D) \cdot \frac{1}{1 + 8 \cdot S4^2/(S2^2 + S3^2)}$$

It can be seen that if S2=S3=S4, then both equations above revert to the original $$X = -(A+B+C+D)/5$$

The extent to which the energy drain in a practical implementation depends on current or voltage will depend on the exact design including electrode topography, amplification and type of exciter.

Different Activities

If each patch has the same area, but they have different activities, then it is the basic equation for M then must be modified.

Again assume a symmetrical arrangement of electrodes, such that the four corner patches are of equal activity T1, the upper and lower mid-side patches are of activity T2, the left and right mid-side patches are of activity T3, and the centre patch is of activity T4.

For the monopole M to be zero, $$0 = T1*(A+B+C+D) + T4*X - T2*(2 \cdot A + 2 \cdot B + X)/4 - T3* \\ (2 \cdot A + 2 \cdot C + X)/4 - T3*(2 \cdot B + 2 \cdot D + X)/3 - T2*(2 \cdot C + 2 \cdot D + X)/4 \quad (26)$$

If only the monopole is considered, and it is assumed that A=B=C=D (equal drive strengths), this becomes:

$$X = 4 \cdot \frac{2 \cdot T1 - T2 - T3}{T2 + T3 - 2 \cdot T4}, \text{ provided } T2 + T3 - 2 \cdot T4 \neq 0 \quad (27)$$

If T2+T3=2·T4, then all the X terms cancel, and there is no single solution for X. In other words the value of X has no effect on the cancellation of the monopole. However it is then required that for M to be zero, T1=T4.

Thus with a nine tile arrangement as discussed above, the desired effect of cancelling the monopole can be achieved with the side electrodes being driven in common.

As an alternative, we revert to the very basic arrangement of FIG. 14 by setting X=0. Now we may balance the potentially non-zero M with a single potential, Z, on the centre electrode.

$$Z := (A + B + C + D) \cdot \frac{2 \cdot T1 - T2 - T3}{2 \cdot T4} \quad (28)$$

Figure 17:
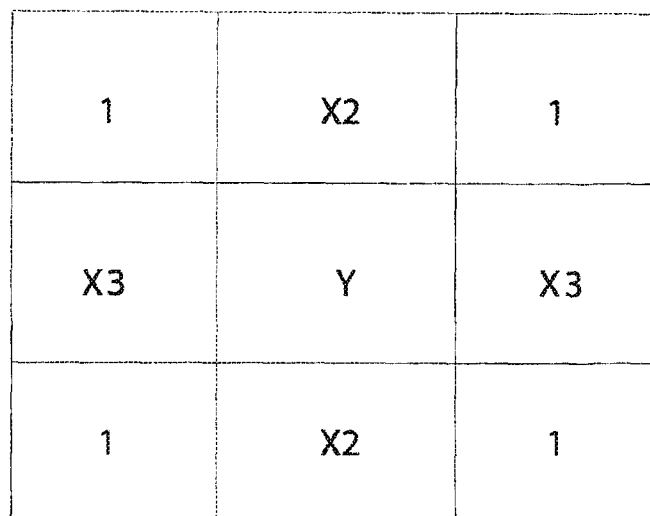

Another possibility is to consider a combination of potentials X2, X3 and Y as per FIG. 17, where each is non zero only for the monopole component (i.e., each scales the mean (A+B+C±D)/4).

First Y can be chosen such that the mean displacement is zero.

$$Y = -2 \cdot \frac{2 \cdot T1 + T2 \cdot X2 + T3 \cdot X3}{T4} \quad (29)$$

Then the sum of the squared potentials is minimized:

$$E = 4 + 2 \cdot X2^2 + 2 \cdot X3^2 + Y^2, \frac{dE}{dX2} = \frac{dE}{dX3} = 0, \quad (30)$$

substitute Y from above gives:

$$X2 = -\frac{4 \cdot T1 \cdot T2}{T4^2 + 2 \cdot (T2^2 + T3^2)}, X3 = -\frac{4 \cdot T1 \cdot T3}{T4^2 + 2 \cdot (T2^2 + T3^2)} \quad (31)$$

then re-using the formula for Y gives $$Y := \frac{4 \cdot T1 \cdot T4}{T4^2 + 2 \cdot (T2^2 + T3^2)} \quad (32)$$

i.e. in terms of the four-channel input, $$\begin{pmatrix} X2 \\ X3 \\ Y \end{pmatrix} = -(A + B + C + D) \cdot \frac{T1}{T4^2 + 2 \cdot (T2^2 + T3^2)} \cdot \begin{pmatrix} T2 \\ T3 \\ T4 \end{pmatrix} \quad (33)$$

The foregoing assumes that the electrodes have equal areas and different activities and provides a formula for determining appropriate drive strengths for the side and centre electrodes. The activities of the electrodes can be determined and then the drive strengths for the side and centre electrodes can be derived from the drive signals applied to the corner electrodes. A suitable processing circuit can be designed to derive the drive signals X2, X3, Y from the applied signals A, B, C, D.

If the areas of the electrodes are different, then if the energy drain depends on area, the areas have to be taken into account as well as activities in order to determine appropriate drive strengths. It is then necessary to determine the extent to which the energy drain depends on voltage and/or current (i.e. electrode area). It is useful to assign a value to this dependence, given below as n.

As noted above, to minimise energy consumption it may be sufficient to minimise the sum of the squared voltages applied to the electrodes. For a theoretical arrangement in which only the squared voltage needs to be taken into account, the value n=0 is ascribed.

If we wish to minimise the electrical energy, E as discussed above can be considered to be proportional to V.I and therefore proportional to $V^2$.Area, rather than $V^2$, and then n=1. (For dimensional correctness, strictly, E is proportional to $V^2 \times$Area, as the current is V×capacitance (assuming V is alternating), and capacitance is proportional to area. Likewise, $E \sim I^2 \sim V^2 \times Area^2$.)

If the energy loss depends on current more than voltage as noted above in connection with equation 24, then the electrical energy is proportional to $V^2$ multiplied by $Area^2$, ($I^2$, ($area^2$)) then n=2.

The general case for optimization, i.e. to cancel the monopole and minimise energy loss is given by:

$$\begin{pmatrix} X2 \\ X3 \\ Y \end{pmatrix} = \quad (34)$$

$$-\frac{(A + B + C + D) \cdot T1}{S2^n \cdot S3^n \cdot T4^2 + 2 \cdot S4^n \cdot (S2^n \cdot T2^2 + S3^n \cdot T3^2)} \cdot \begin{pmatrix} S3^n \cdot S4^n \cdot T2 \\ S2^n \cdot S4^n \cdot T3 \\ S2^n \cdot S3^n \cdot T4 \end{pmatrix}$$

In a practical situation a circuit may have any value of n between 0 and 2. In the following n is referred to as the energy/area exponent.

EXAMPLES

Equal Area Tiles:

Consider a simply-supported panel with the simplest arrangement, where all nine tiles are approximately equal in area. According to a first-order approximation, i.e. using only a 1st-order expansion of the displaced shape $\sin(\pi \cdot x/Lx) \sin(\pi \cdot y/Ly)$, the relative activities are T4=2·T2=2·T3=4·T1. (if a higher-order approximation is used, i.e. a sum of harmonics, the areas of tiles needed to achieve this is slightly different, and depends on the aspect ratio of the rectangle.) With these values, the general case for optimisation evaluates to $$\begin{pmatrix} X2 \\ X3 \\ Y \end{pmatrix} = -\frac{(A + B + C + D)}{32} \cdot \begin{pmatrix} 2 \\ 2 \\ 4 \end{pmatrix} \quad (35)$$

Equal Activities:

By reusing the analyses of the previous example, we may find where to divide the tiles so that T1=T2=T3=T4 (at least approximately). For this geometry, we could use the arrangement of FIG. 15, and make use of equations (22), (23) or (24). Alternatively, we could use the fully free arrangement of FIG. 17 with appropriate minimisation. The voltage-squared minimisation of equation (36) below gives the same answer as equation (22).

$$\begin{pmatrix} X2 \\ X3 \\ Y \end{pmatrix} = -\frac{(A+B+C+D)}{5} \cdot \begin{pmatrix} 1 \\ 1 \\ 1 \end{pmatrix} = -(A+B+C+D) \cdot \begin{pmatrix} 0.2 \\ 0.2 \\ 0.2 \end{pmatrix} \quad (36)$$

The IV minimisation gives:

$$\begin{pmatrix} X2 \\ X3 \\ Y \end{pmatrix} = -\frac{(A+B+C+D)}{S2 \cdot S3 + 2 \cdot S4 \cdot (S2+S3)} \cdot \begin{pmatrix} S3 \cdot S4 \\ S2 \cdot S4 \\ S2 \cdot S3 \end{pmatrix} =$$

$$-(A+B+C+D) \cdot \begin{pmatrix} 0.214 \\ 0.291 \\ 0.134 \end{pmatrix}$$

The $I^2$ minimisation gives:

$$\begin{pmatrix} X2 \\ X3 \\ Y \end{pmatrix} = -\frac{(A+B+C+D)}{S2^2 \cdot S3^2 + 2 \cdot S4^2 \cdot (S2^2+S3^2)} \cdot \begin{pmatrix} S3^2 \cdot S4^2 \\ S2^2 \cdot S4^2 \\ S2^2 \cdot S3^2 \end{pmatrix} = \quad (38)$$

$$-(A+B+C+D) \cdot \begin{pmatrix} 0.223 \\ 0.233 \\ 0.0875 \end{pmatrix}$$

Equal Voltage:

As noted above there may be advantages to the voltages being equal in magnitude. For example this can simplify the design of the drive circuitry since multiple components of the same kind may be used. In this case the formula for X2, X3 and Y would be $$\begin{pmatrix} X2 \\ X3 \\ Y \end{pmatrix} = -\frac{(A+B+C+D)}{4} \cdot \begin{pmatrix} 1 \\ 1 \\ 1 \end{pmatrix} \quad (39)$$

To achieve this it would be necessary to form an arrangement whereby this was the optimum solution, i.e.

$$4 \cdot T1 - 2 \cdot (T2+T3) - T4 = 0 \text{ for zero net displacement.} \quad (40)$$

This relationship between electrode activities may be achieved by suitable choice of electrode area and/or positioning. For example there may be scope to vary the positioning of the electrodes if they do not take up the whole area of the panel. It will be appreciated that there may be other ways of controlling the activities of electrodes such as constraining their freedom of movement by external means.

To minimise the energy drain it is necessary to achieve:

$$\delta(4 \cdot S1^n + 2 \cdot (S2^n + S3^n) + S4^n) = 0 \quad (41)$$

where as noted above n=0 for $V^2$, 1 for I.V, and 2 for $I^2$
(Variational calculus; the delta means 'the variation of', and essentially means that the derivative with respect to each of the variables must be zero at a minimum value of the function.)

Using the 1st-order approximation, it can be shown that an arrangement that minimises the current ($I^2$) has the properties x/Lx=y/Ly=0.405 for a panel with aspect ratio Lx/Ly (referred to above as alpha).

The forgoing considered useful geometric arrangements that provide zero-mean displacement with either equal voltages or globally minimum energy, or both. It should be clear that these arrangements need not all use straight line boundaries between electrodes. It is also worth noting that other criteria of optimisation may exist—for example, the uniformity of achievable excitation over a region of interest (or the whole panel).

Connection of Signals in Common

Options for driving nine tiles from four primary input channels have been considered. These involved, in principle, five extra derived signals. Exploiting symmetry, these five signals were shown to be reducible to three distinct new signals. In the following consideration is given to whether some or all of the extra signals can be connected in common and mathematically optimal ways of doing this.

We revert to equation (34), the general equation for optimisation:

$$\begin{pmatrix} X2 \\ X3 \\ Y \end{pmatrix} = \quad (34)$$

$$-\frac{(A+B+C+D) \cdot T1}{S2^n \cdot S3^n \cdot T4^2 + 2 \cdot S4^n \cdot (S2^n \cdot T2^2 + S3^n \cdot T3^2)} \cdot \begin{pmatrix} S3^n \cdot S4^n \cdot T2 \\ S2^n \cdot S4^n \cdot T3 \\ S2^n \cdot S3^n \cdot T4 \end{pmatrix}$$

where; n=0 for $V^2$, 1 for I.V, and 2 for $I^2$ minimisation; T are the relative activities of each tile, and S are the corresponding relative surface areas.

For a common drive arrangement, it is necessary that X2=X3=Y. It is useful firstly to consider what it necessary to achieve X2=X3, and then consider what additional constraints are necessary for both to equal Y.

For X2=X3 it can be derived from equation (34) that:

$$S3^n \cdot S4^n \cdot T2 = S2^n \cdot S4^n \cdot T3 \quad (42a)$$

$$S2^n \cdot S4^n \cdot T3 = S2^n \cdot S3^n \cdot T4 \quad (42b)$$

$$S2^n \cdot S3^n \cdot T4 = S3^n \cdot S4^n \cdot T2 \quad (42c)$$

What dimensions must the electrodes have in order to satisfy the foregoing? In the following this is considered in terms of the dimensions of the corner panels as a fraction of the dimensions of the panel overall, beginning with a square panel.

Beginning with equations (34a), (34b) and (34c), it is possible to determine an energy function $f(n, \beta)$
in which the only variables are the energy/area exponent n to the ratio $\beta$ of the length of a corner panel to the overall panel length.

Initial attempts to define $f(n, \beta)$ gave spurious results but more detailed investigation gave the following:

for $\beta$ near 0 (effectively one electrode across the majority of the panel)

$$f(n,\beta)/\beta^2 \approx -\pi^2/2 + 2 \cdot \beta^{(n-2)} + O(\beta) \text{ for } n>2 \quad (43a)$$

$$f(n,\beta)/\beta^2 \approx (2-\pi^2/2) + O(\beta) \text{ for } n=2 \quad (43b)$$

$$\eta(n,\beta)/\beta^n \approx 2 + O(\beta) \text{ for } n<2 \quad (43c)$$

for β near ½, (in effect four electrodes quartering up the panel) $\epsilon=(1-2\beta)$ near 0

$$f(n,\beta)/\epsilon \approx \pi/2^n + O(\epsilon) \text{ for } n>2 \quad (44a)$$

$$f(n,\beta)/\epsilon \approx (\pi/2-1) + O(\epsilon^2) \text{ for } n=1 \quad (44b)$$

$$f(n,\beta)/\epsilon^n \approx -1 + \pi/2^n \cdot \epsilon^{(1-n)} + O(\epsilon) \text{ for } n<1 \quad (44c)$$

Figure 18:
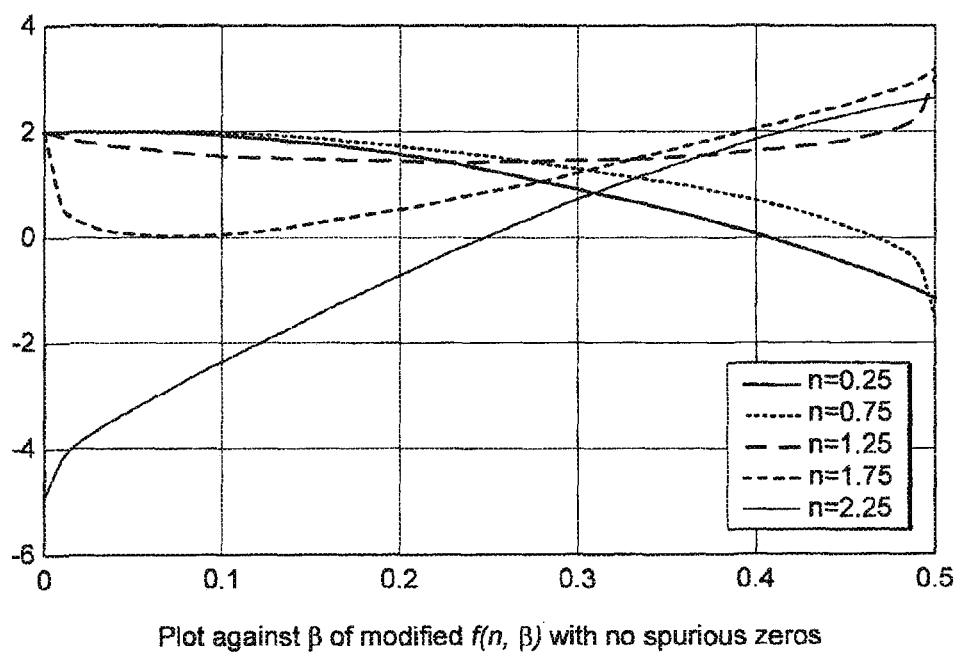
FIGS. 18 to 21 are various graphs exploring the relationship between electrode division points, the energy dissipation in a device and the dependence of dissipation on electrode area.

If $f(n, \beta)$ is plotted against β for various values of n, then for certain values of n the function $f(n, \beta)$ crosses zero. Results for some values of n are shown in FIG. 18. However there are values of n for which the line does not cross zero and $f(n, \beta)$ there is no solution to $f(n, \beta)=0$.

Figure 19:
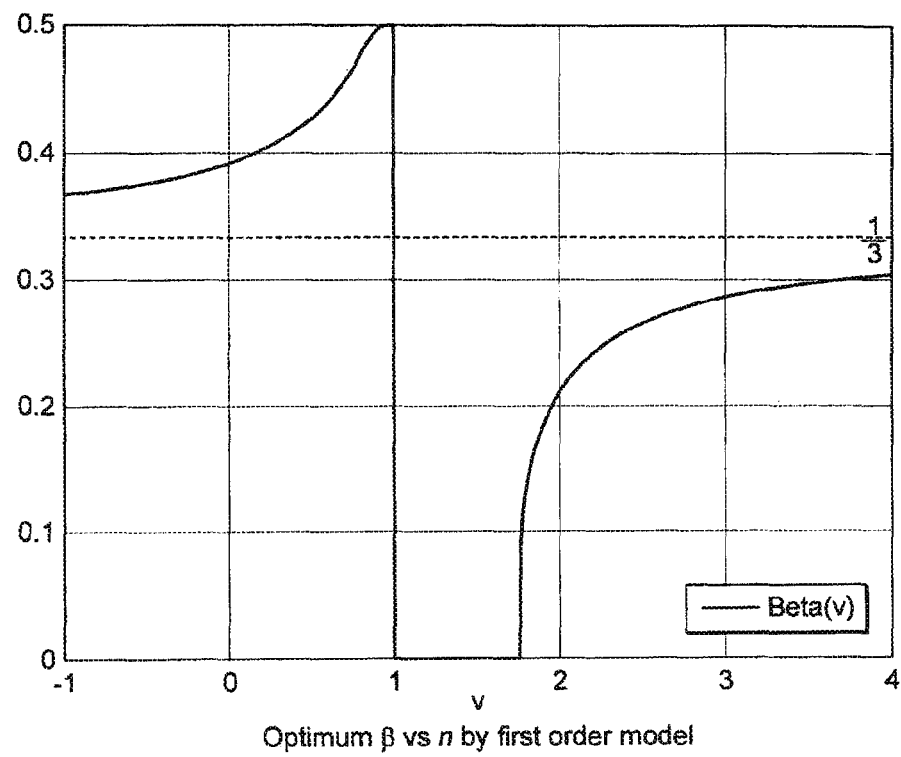

This first-order solution shows that for systems whose energy costs are dominated by either voltage (n near 0) or current (n near 2), there are solutions to the set of equations (42). The full range of solutions is shown in FIG. 19. For n=0, $\beta=a\cos(\frac{1}{3})/\pi=0.3918$. For n=2, β=0.2127. For systems where the electrical energy (i.e. voltage times current) is important, there is no effective solution. We may set X2=X3, and then separately optimise Y for a given value of β. As |n| tends to infinity, β tends to ⅓, in effect nine electrodes of equal area.

The foregoing can be used in the design of the electrode layout for panels. Having determined n for a device, then for certain values of n there are optimum values for β.

If the same levels of analysis were to be applied to a multi-term approximation, similar trends to the single term approximation would be observed. For a square panel, $\gamma=\delta=\beta$ (beta is the ratio of the length of a corner panel to the overall panel length) is still valid but with a rectangular panel there is some variation. When n=0, the variation between results given by the single term analysis and the multi-term analysis is zero at both extremes of β and small in between. When n=1, the variation between results increases with β. When n=2, the variation increases with ½–β.

Figure 20:
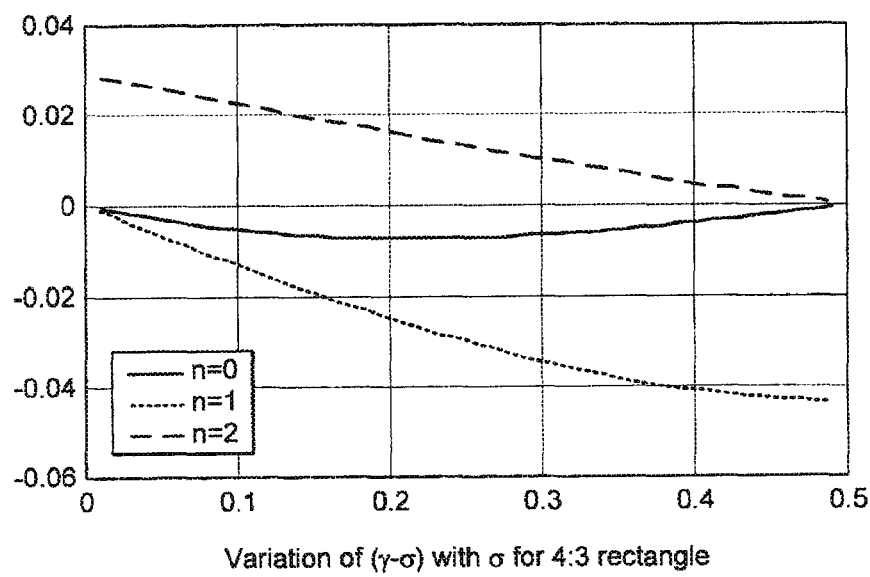
Figure 21:
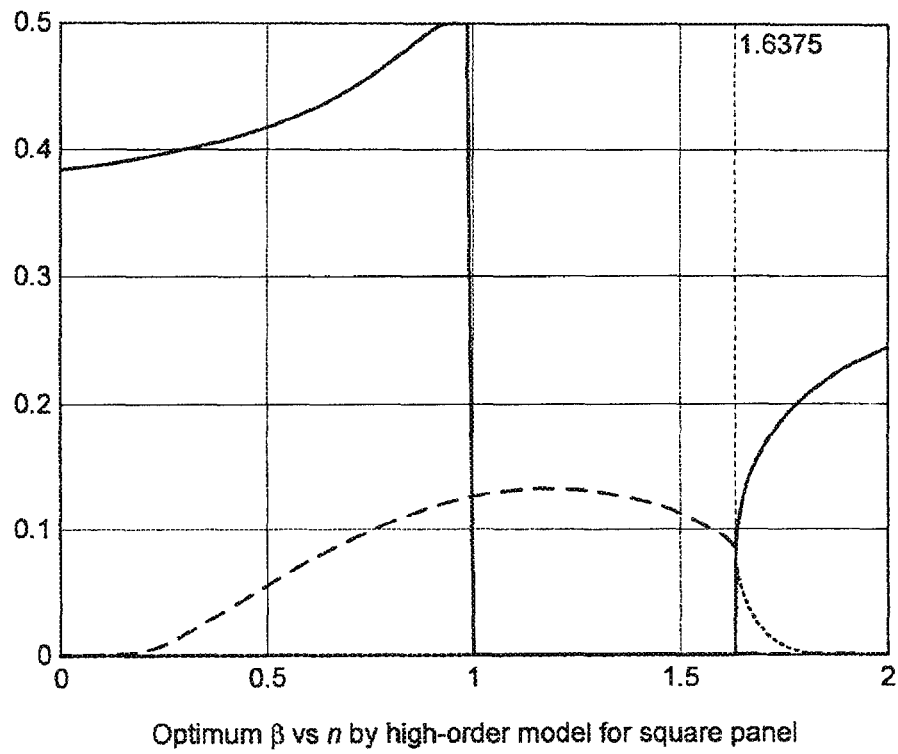

The solutions are shown in FIG. 20 which show variations of γ–δ for a 4:3 aspect ratio panel. For a square panel, assuming a common root γ=δ=β the optimum value follows the graph in FIG. 21. Whilst this differs quantitatively from FIG. 20 it exhibits similar behaviours.

There is a single root for low n, approaching β=½ as n→1. Above n=1.6375, two roots emerge, one of which rapidly decays to zero. The dashed line represents a local minimum of the error function, and is not a true root of the original equations. It does, however, suggest a best solution for values of n between 1 and 1.6375.

For rectangular panels of aspect ratio, α, between 1 and 3, the following results have been collated. For n=0, (voltage-squared minimisation)

$$\gamma \approx \frac{1304 - 30 \cdot \alpha}{3318}, \frac{\gamma}{\delta} \approx \alpha + \frac{1 - \alpha^2}{49} \quad (45)$$

For n=2, (current-squared minimisation)

$$\gamma \approx \frac{103 - 10 \cdot \alpha}{460}, \frac{\gamma}{\delta} \approx \alpha + \frac{\alpha^2 - 1}{11} \quad (46)$$

For n=2, the relationships are less linear, and a better pair of equations including $2^{nd}$ order terms are:

$$\gamma \approx \frac{3311 + 497 \cdot \alpha - 40 \cdot \alpha^2}{15448}, \frac{\gamma}{\delta} \approx \alpha + \frac{\alpha^2 + 1.57 \cdot \alpha - 2.65}{15.7} \quad (46a)$$

To summarise, from the high-order solution we see that for systems whose energy costs are dominated by either voltage (n near 0) or current (n near 2), there are solutions to the set of equations (42). For n=0, γ and δ are obtained from equation (12). For n=2, γ and δ are obtained from equation (13). For systems where the electrical energy (i.e. voltage times current) is important, there is no optimum solution. We may, however, set X2=X3, and then separately optimise Y for the given values of γ and δ.

Assuming A=B=C=D=1:
For a square panel;
for n=0, (voltage-squared minimisation), γ=δ=0.3838, X2=X3=Y=0.8186
($1^{st}$ order; γ=δ=0.3918, X2=X3=Y=0.8)
for n=2, (current-squared minimisation), γ=δ=0.2442, X2=X3=Y=0.1147
($1^{st}$ order; γ=δ=0.2127, X2=X3=Y=0.048)
For a 4:3 ratio rectangular panel;
for n=0, (voltage-squared minimisation), γ=0.3811, δ=0.3854, X2=X3=Y=0.8181
for n=2, (current-squared minimisation), γ=0.2524, δ=0.2389, X2=X3=Y=0.1153
For a 16:9 ratio rectangular panel;
for n=0, (voltage-squared minimisation), γ=0.3769, δ=0.3862, X2=X3=Y=0.8165
for n=2, (current-squared minimisation), γ=0.2634, δ=0.2356, X2=X3=Y=0.1157

Using the voltage-squared minimisation case, a finite element model was used to verify the above results. The model followed the theoretical system, but added the realism of real panel thickness, an offset piezoelectric layer, and an acoustic cavity. In addition, the electrodes were separated by a 0.5 mm gap to avoid short-circuits. The panel had a 4:3 aspect ratio.

Rms error at theoretical result:=0.01674122
Converged results:
γ=0.38035
δ=0.38426
X2, X3, Y=–[0.8271, 0.8280, 0.8208]
Tests of Convergence
1–2·(T2·X2+T3·X3)–T4·Y=0.0
Rms error at above result=0.00676714

Use of Geometry to Equalise Drive Activities

It has been mentioned above that it is desirable to apply voltages of equal magnitude to all electrodes. One advantage of this is that components of the same value can be used in the drive circuitry thereby saving on cost and complexity in manufacture. The following considers in more detail the use of geometry to equalise drive activities, thus setting the average displacement of the monopole to zero when voltages of equal magnitude are applied to all electrodes. All of the configurations considered are variations on the arrangement given in FIG. 17. The use of trapezoidal patches is also considered (the dividing lines between patches are still straight lines, but no longer parallel with the outside edges of the panel). In all cases, bi-lateral symmetry is assumed.

MDQ Sets

Just as the fundamental arrangements of a 2-channel L/R system are L+R and L–R, the four-channel system has the four MDQ combinations. M=monopole; D=dipole, of which there are 2; Q=quadrupole. The reciprocal relationships between ABCD and MDQ are neatly summarised by the matrix equations (1), below. Thus, any combination of the four inputs A through D may be mapped onto a combination of MDQ set, and vice-versa. Only the M set has a non-zero net displacement, so this is the only one that needs further attention.

$$\begin{pmatrix} A \\ B \\ C \\ D \end{pmatrix} = T \cdot \begin{pmatrix} M \\ D1 \\ D2 \\ Q \end{pmatrix}, \begin{pmatrix} M \\ D1 \\ D2 \\ Q \end{pmatrix} = T \cdot \begin{pmatrix} A \\ B \\ C \\ D \end{pmatrix}, \quad (47)$$

$$T = \frac{1}{2} \cdot \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

Five (4+1) Signal Options—Rectangular Patches

For the purposes of this particular study, we assume X2=X3=Y=−1, and adjust the geometry such that M produces no net displacement. (For D and Q, X2=X3=Y=0.)

Figure 22:
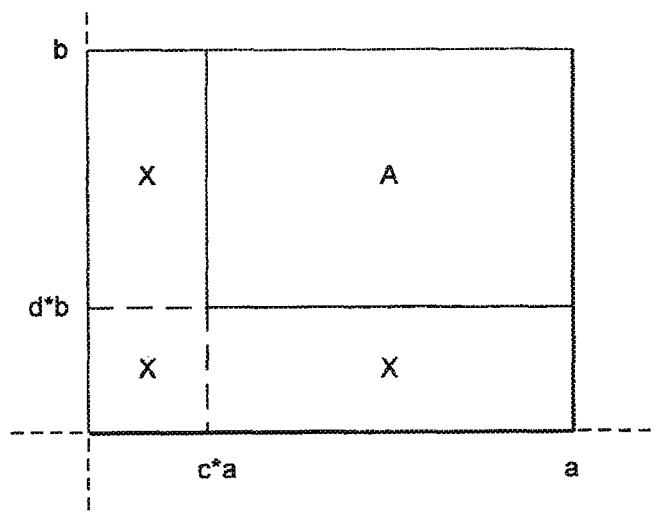
FIG. 22 is a diagram of ¼ of panel for (4+1) signal 'rectangular' geometry options.
Figure 23:
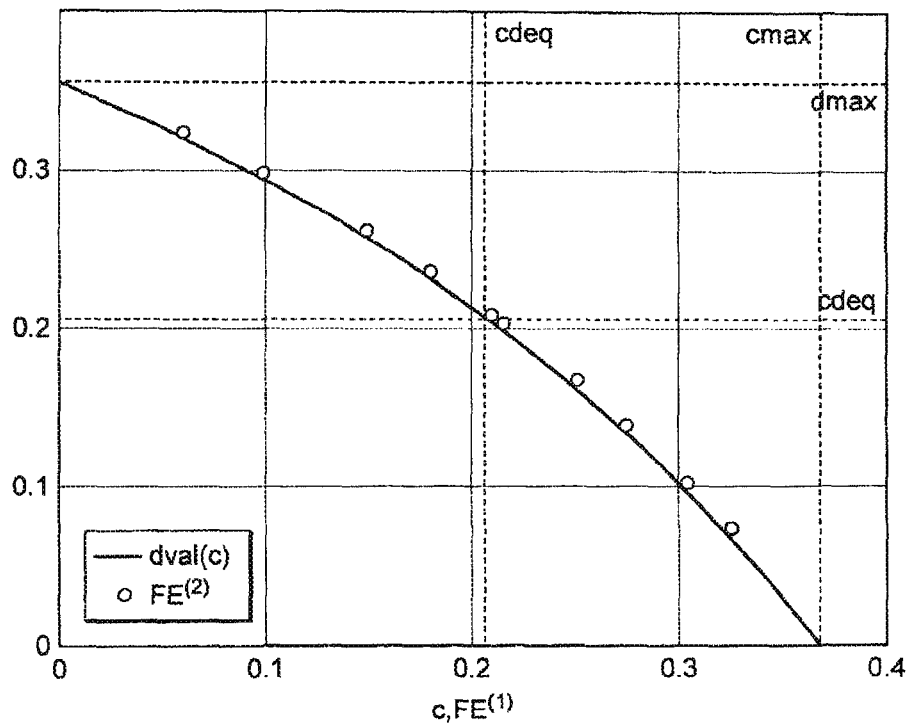
FIG. 23 is a graph showing the relationship between electrode division points for aspect ratio 4/3.

Because bi-lateral symmetry is being assumed, only consider a ¼ model needs to be considered FIG. 22. For this model, a, b and α are newly defined and do not relate to the same items mentioned in the foregoing models.

The geometry is parametrised via c and d, which represent fractions of a and b respectively, where a is half of Lx (the width) and b is half of Ly (the height). Further, the aspect ratio a/b is referred to by the parameter α, which by convention is considered to be greater than or equal to unity (every case for which α<1 has a dual in which the x and y axes swap roles to give α>1). Two methods of analysis are applied; an analytical model of a simply-supported plate with the appropriate anisotropic layer combination, and a finite element model.

The former is faster, but cannot include the effects of acoustic cavities or non-engineering boundary conditions. In a practical implementation, the acoustic cavity would be formed between the panel and any containing box. In FIGS. 10 and 11 the cavity would most likely be on the piezo side as the transducers would be inside the box. The mean displacement is directly accessible from the model.

The latter is more flexible, and allows modelling of such things as gaps between electrodes in addition to acoustic cavities or non-engineering boundary conditions. Calculation of mean displacement is achieved by observing the net pressurisation of the cavity at its centre. The cavity is made reasonably deep, and the boundary conditions kept simple so that meaningful comparisons may be made between the results of the two analyses.

For zero net displacement (or minimisation of |pressure|^2), there is a relationship between c and d, which is affected slightly by the aspect ratio. (For static (i.e. 0 Hz) activation, the pressure should be the same everywhere in the cavity, and be directly proportional to the change in volume caused by the displacement. 0 net displacement=0 volume change=0 pressure change.) The results for a/b=4/3 are plotted below in FIG. 22. The critical values cmax, dmax and cdeq are highlighted, where;

cmax=value of c which requires d=0
dmax=value of d which requires c=0
cdeq=value of c and d required if c=d.

In FIG. 22 the solid line plots results obtained via the analytical solution, and the blue circles indicate isolated finite element (FE) results.

The table below gives values of cmax, dmax and cdeq for other aspect ratios.

| Aspect ratio | cmax | dmax | cdeq |
|---|---|---|---|
| 1:1 | 0.3600 | 0.3600 | 0.2063 |
| 8:7 | 0.3630 | 0.3575 | 0.2065 |
| 4:3 | 0.3674 | 0.3553 | 0.2071 |
| 3:2 | 0.3715 | 0.3539 | 0.2079 |
| 16:9 | 0.3784 | 0.3524 | 0.2094 |
| 2:1 | 0.3840 | 0.3516 | 0.2108 |

The arrangements considered all assume that the corner electrodes carry the primary signals. A variation in which the primary signals are carried by the patches at the centres of each side is also possible. In this case, however, a different mapping matrix is required, which has the effect of introducing an additional constraint to the values of c and d.

$$\begin{pmatrix} A \\ B \\ C \\ D \end{pmatrix} = T \cdot \begin{pmatrix} M \\ D1 \\ D2 \\ Q \end{pmatrix}, \begin{pmatrix} M \\ D1 \\ D2 \\ Q \end{pmatrix} = T \cdot \begin{pmatrix} A \\ B \\ C \\ D \end{pmatrix},$$

$$T = \frac{1}{2} \cdot \begin{pmatrix} 1 & 1 & 1 & 1 \\ \sqrt{2} & 0 & -\sqrt{2} & 0 \\ 0 & \sqrt{2} & 0 & -\sqrt{2} \\ 1 & -1 & 1 & -1 \end{pmatrix}$$

Figure 24:
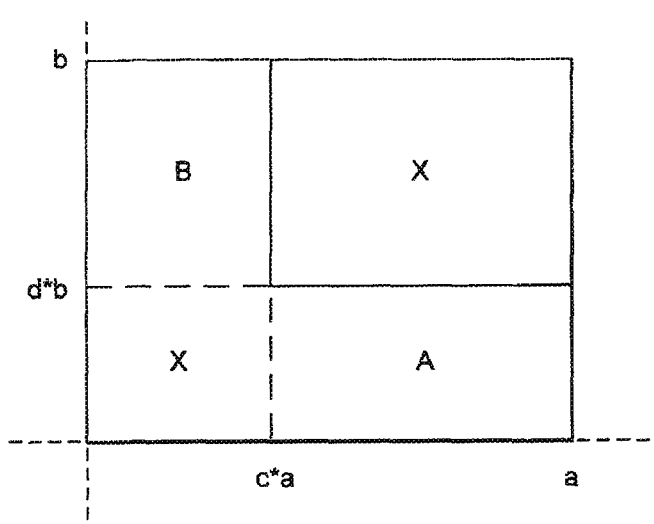
FIG. 24 is a diagram of ¼ of panel for (4+1) signal 'rectangular, side-driven' geometry options.
Figure 25:
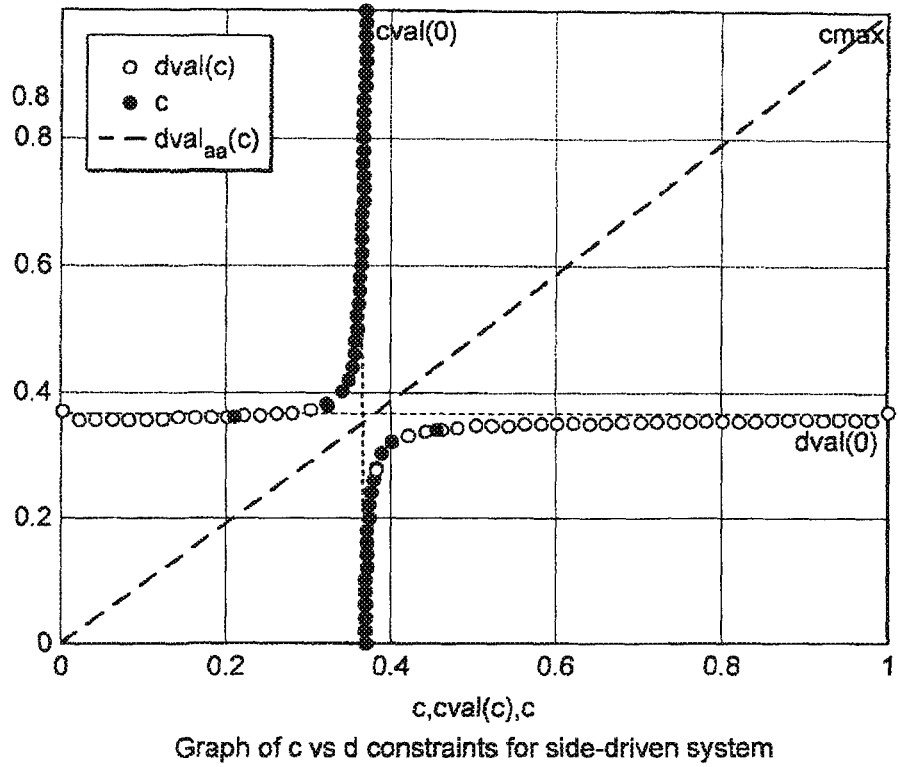
FIG. 25 is a graph of electrode division constraints for a side-driven system.

In this arrangement, shown in FIG. 24, X=−1 for M (A=B=1) and X=0 for D1 (B=0), D2 (A=0) and Q (A=−B=1). The quadrupole, Q, also needs to be balanced so that A=B. The c vs d constraints for a side-driven system are shown in FIG. 25.

It turns out that to satisfy the quadrupole balance, c is very nearly equal to d (green, dashed line), but unfortunately the monopole balancing constraint (red and blue circles) does not satisfy this for any values of c or d. The asymptotic values of c, d are the same cmax and dmax that result from the corner-driven case, but the solution to the monopole constraint avoids the crossing point at around (0.36, 0.36). This indicates that it is not possible to cancel the monopole and quadrupole, which might indicate that the corner driven arrangement is preferable.

Five (4+1) Signal Options—Trapezoidal Patches

Figure 26:
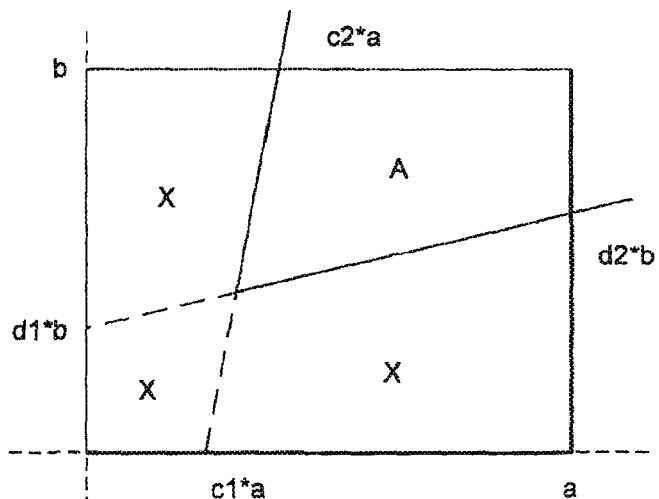
FIG. 26 is shows trapezoidal patch geometry (corner drive case)

Let us now allow the divisions between electrodes to be non-parallel to the panel edges, as per FIG. 26. A variation of this that follows FIG. 24 would allow for edge drive. There are now four parameters used to describe the geometry. After satisfying the balancing requirements, that leaves 3 free parameters for the corner-driven case, or 2 for the edge-driven case.

Figure 27:
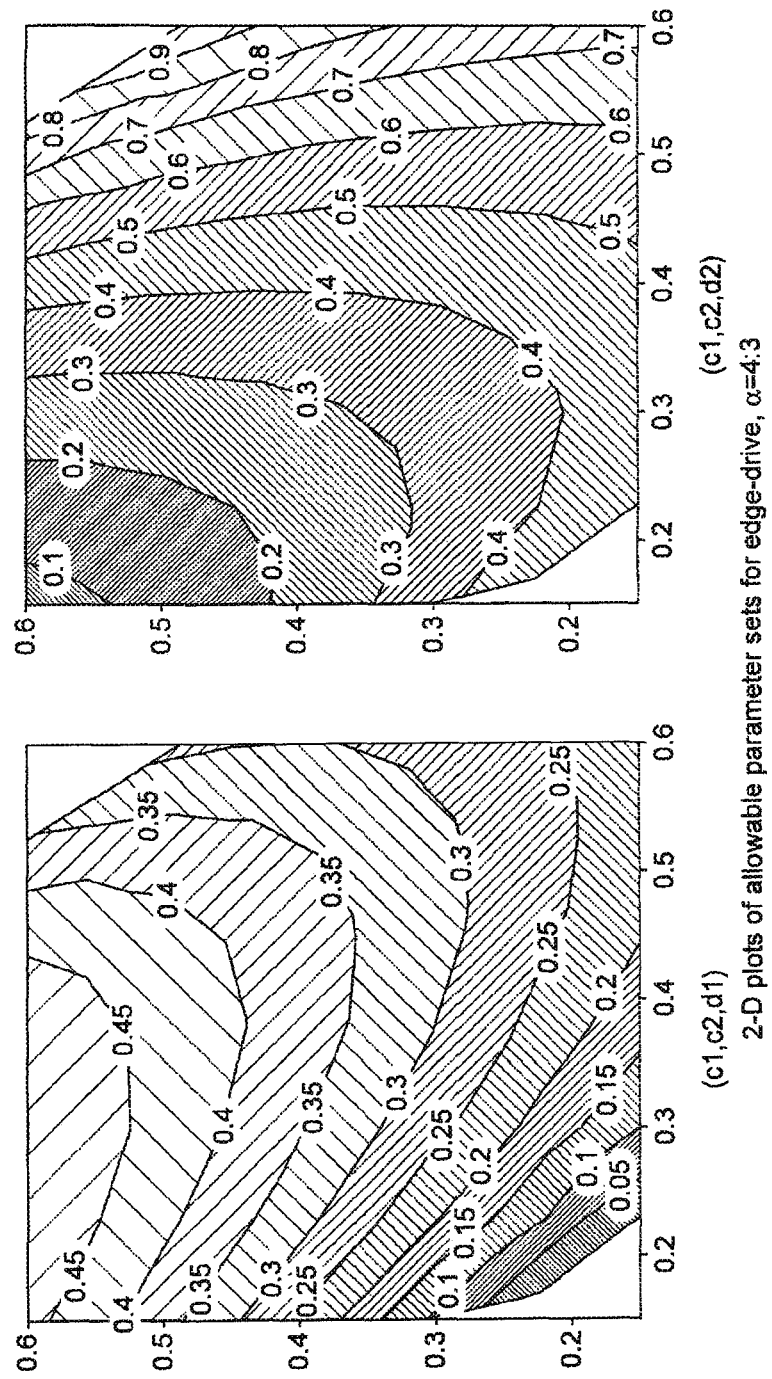
FIG. 27 shows 2D plots of allowable parameter sets for edge drive.

FIG. 27 shows allowable parameter sets for edge-drive with α=4:3. Similar parameter sets can be derived for other aspect ratios. While side-driven configurations exist, they typically result in smaller and more variable displacement fields than can be achieved using corner-drive, so would not be used by preference. However, since there are only 2 free variables, it is easier to explore the complete set of options. FIG. 27 shows the values of d1 and d2 for most of the allowable c1 and c2 combinations (i.e. those that result in values of d1 and d2 that lie between 0 and 1)—the white areas are not allowable.

Figure of Merit

In order to decide which arrangement is best, it is desirable to produce figures of merit (FOM) for each and rank them. To decide what to use as a FOM, we can consider the main function of the active panel—that is to produce localised displacement. So if the maximum displacement possible is calculated for a systematic distribution of sampling points, the statistics of the results may be used. Two possible figures of merit are suggested; the mean of the maxima, which is directly related to the system sensitivity; the ratio of mean to standard deviation, which favours arrangements that produce the most consistent displacement maxima. It would also be possible to consider the current draw of the piezoelectric patches, and factor this into the FOM.

The first step is to realise that four symmetry cases are involved—SS, AS, SA, AA=>M, D1, D2, Q, where S=symmetrical, A=anti-symmetrical, first letter refers to x, second letter to y. Let the displacements at a sample point for unit excitation of each case be, u1, u2, u3 and u4, respectively. Let u1c=complex conjugate of u1, etc.;

$$|U|^2 = u1 \cdot u1c + u2 \cdot u2c + u3 \cdot u3c + u4 \cdot u4c$$

It can be shown that maximum displacement for a unit sum of squared excitations is achieved by exciting symmetry case 1 by $u1c/|U|$, symmetry case 2 by $u2c/|U|$, etc. Hence for any member of the sampled set, it is possible to obtain the maximum displacement by appropriate scaling of the results for each symmetry case.

Figure 28:
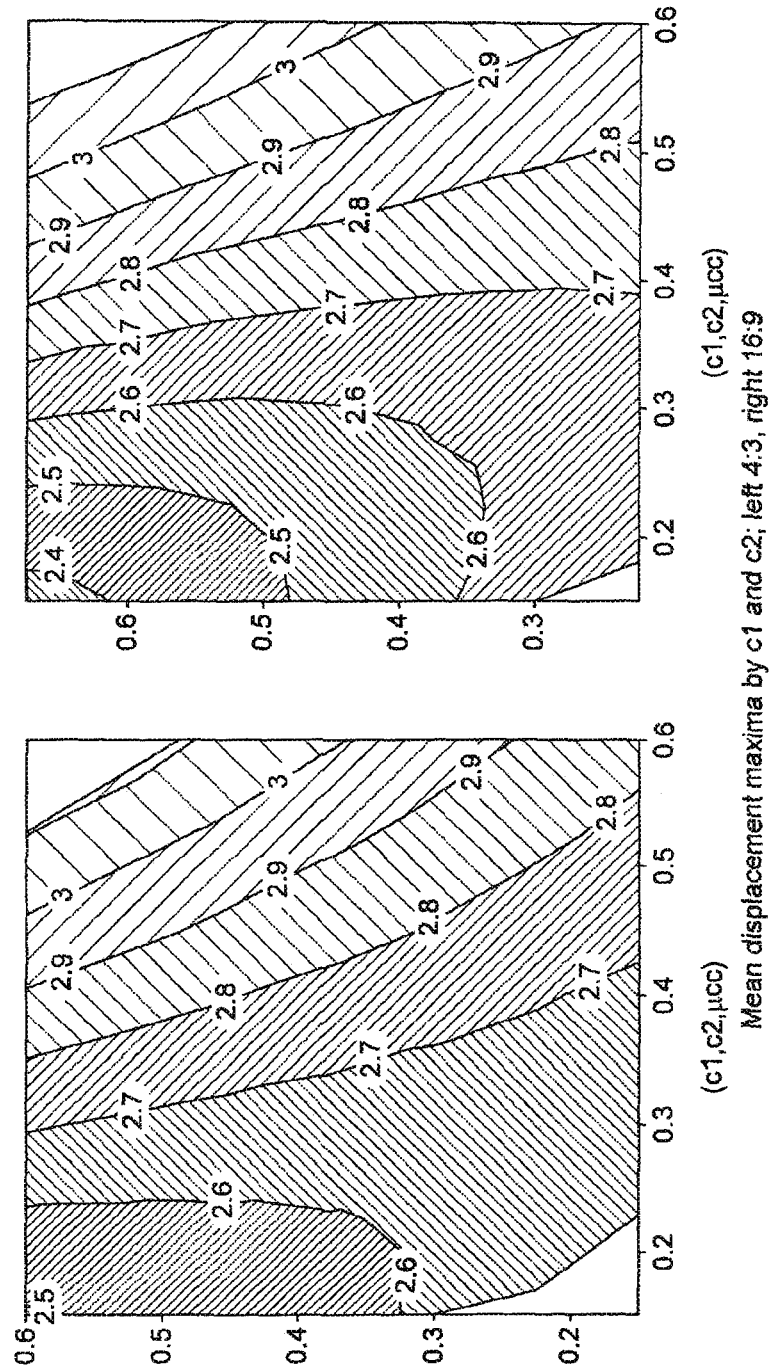
FIG. 28 shows 2D plots of mean displacement maxima for various panel dimensions.
Figure 29:
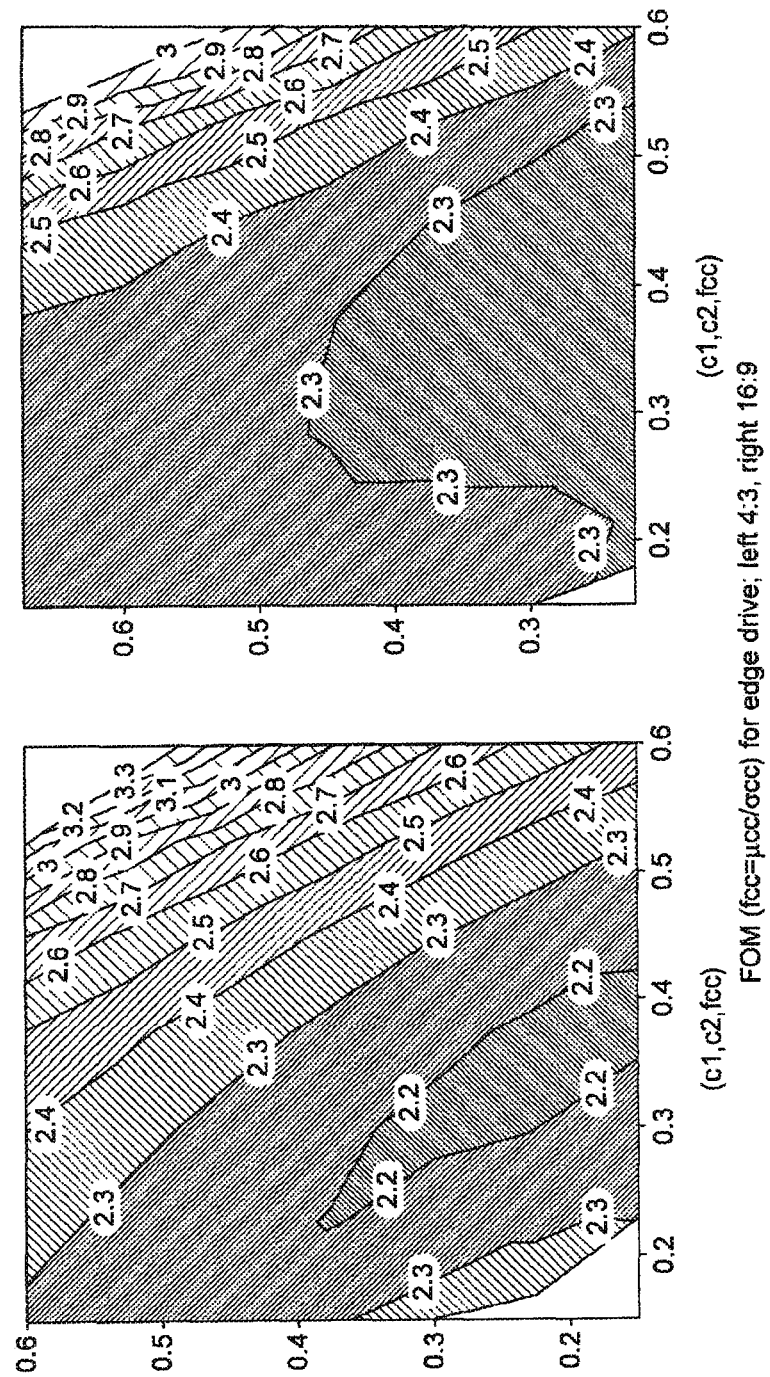
FIG. 29 shows figures of merit for various edge drive parameters.

From FIGS. 28 and 29, we see that the "best" configurations are those with large c1 and c2 values, leading to an extreme value of 1 for d2. That said, the difference between "worst" and "best" is not that extreme, the worst-case mean being about ¾ of the best-case.

Figure 30:
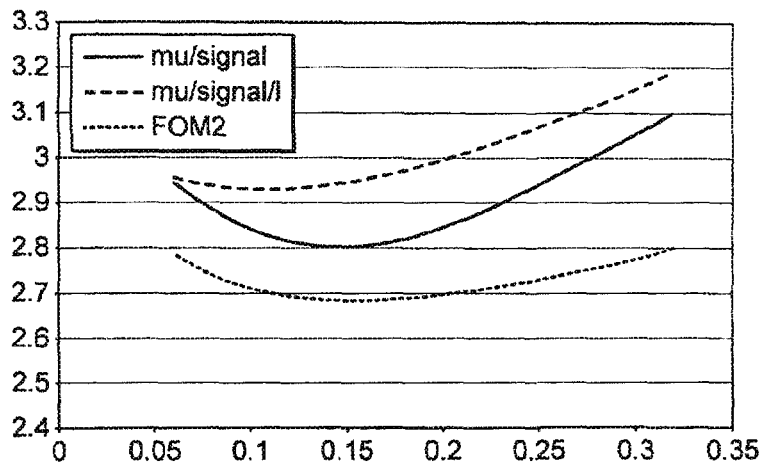
FIGS. 30 and 31 show figures of merit for corner driven electrode sets.
Figure 31:
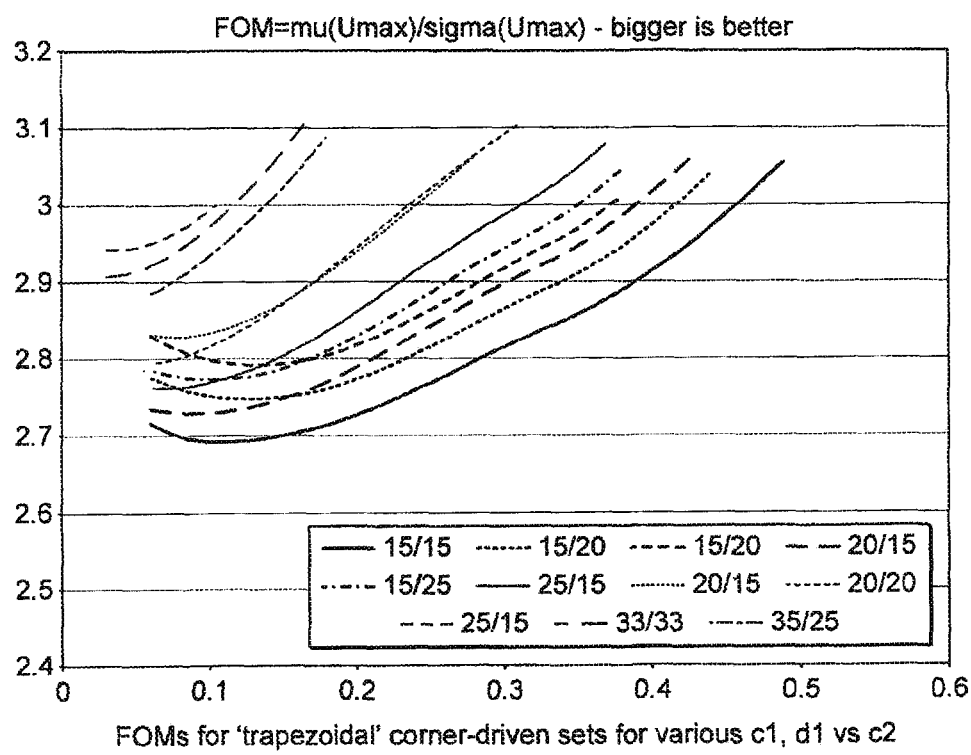

Similar results have been obtained for corner-drive configurations, only this time the best are those in which c2 is large and d2 is small. The results for c1=c2, d1=d2, are shown in FIG. 30, and for various c1≠c2 in FIG. 31 (the legend is 100·c1/100·d1 so, for example 15/25=>c1=0.15, d=0.25; the x-axis is c2), below. The aspect ratio is 4:3.

Figure 32:
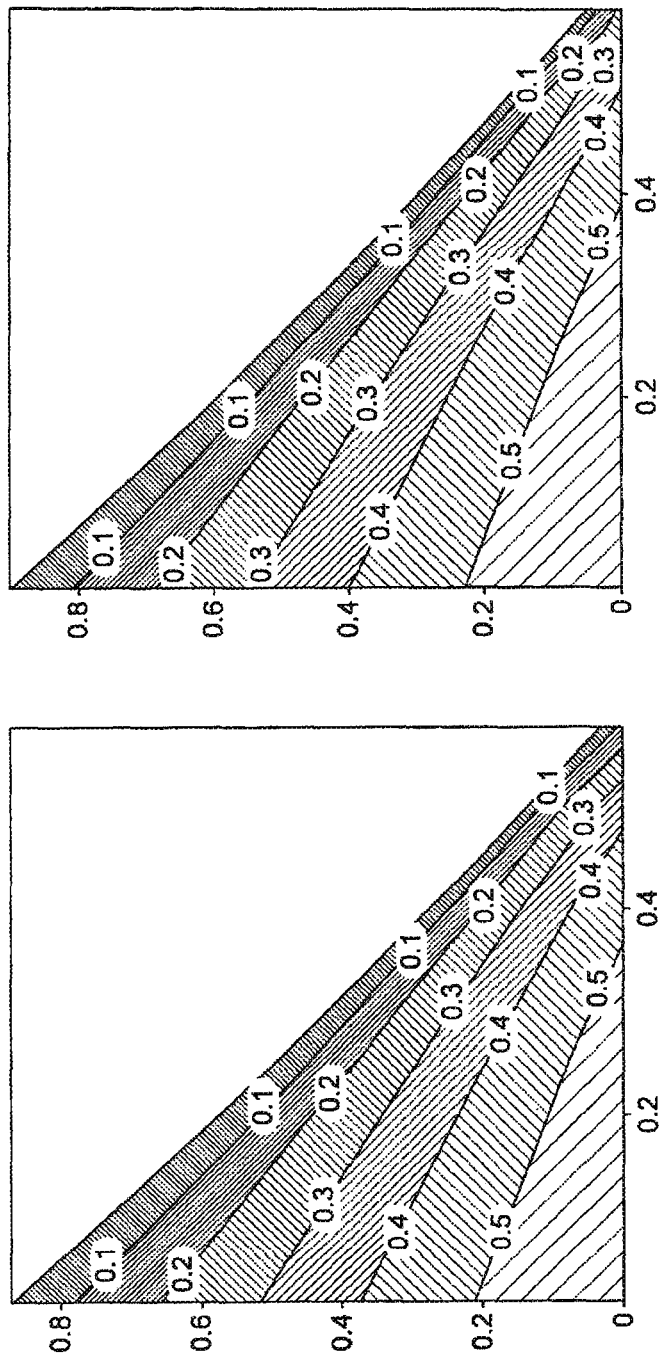
FIG. 32 shows relationships between side dimensions for trapezoidal geometry.

Fixing d2=0 leaves only 2 free variables, so again it is easier to explore the complete set of options. FIG. 32 shows the values of d1 for most of the allowable c1 and c2 combinations (i.e. those that result in a value of d1 lies between 0 and 1—the white areas are not allowable) for two aspect ratios, and the result seem less affected by the aspect ratio.

Figure 33:
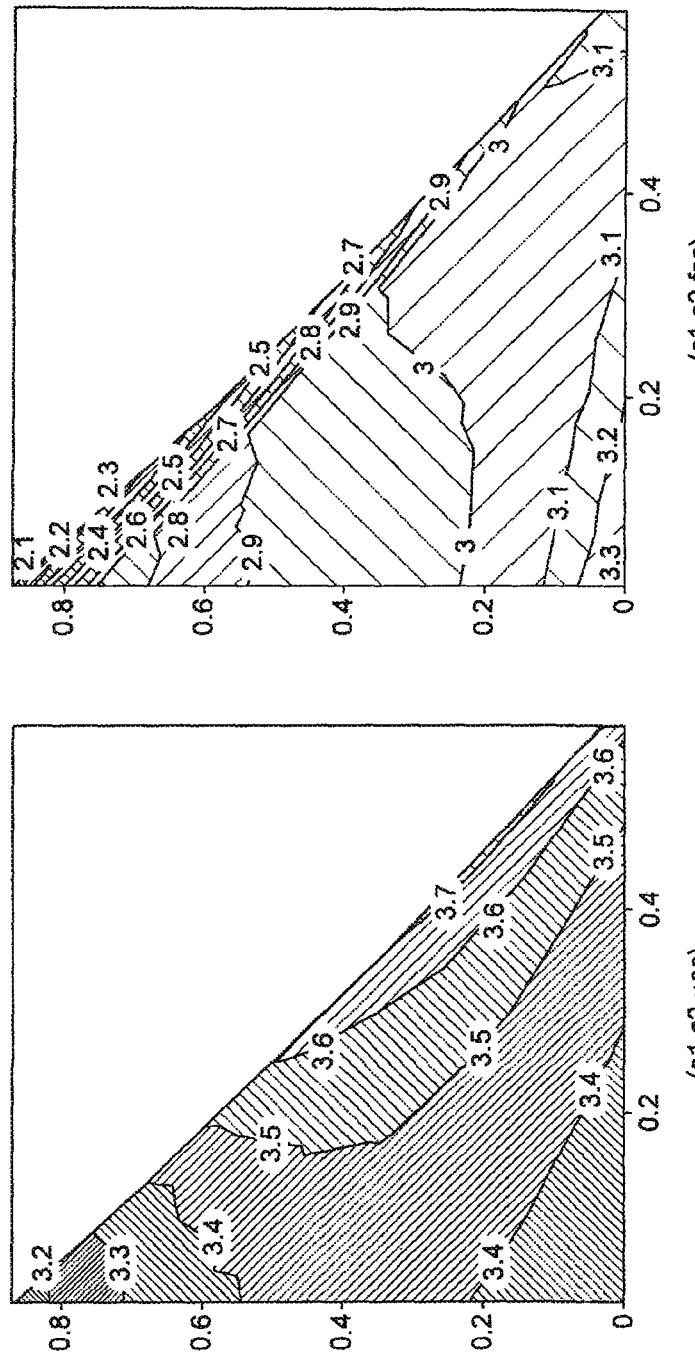
FIG. 33 shows corner drive mean and figures of merit for various side dimensions.

From FIG. 33, which shows the two figures of merit for corner-drive, we see that the lowest mean value matches the best achieved by the edge-drive system. There is, however, some conflict between the two measures, with perhaps the best compromise being for c2 near 0. The best value of mean is 3.73 (FOM=3.03), and is obtained with c1≈0.44, c2≈0.25, d1≈0. The best value of FOM is 3.34 (mean=3.36), and is obtained with c1≈0, c2≈0, d1≈0.6. The compromise values are mean=3.65 to 3.67, FOM=3.14 to 3.13 with c1≈0.6, c2≈0, d1≈0. All of these options push the geometry to an extreme, where the values of at least two of the parameters become 0.

Eight (4+4) Signal Options

An observation from the results of the 4+1 case was that the 'X' patches do nothing to help improve the displacement values—in fact, they often fight against the actual inputs. As a result, the arrangement of FIG. 34 was suggested.

Figure 34:
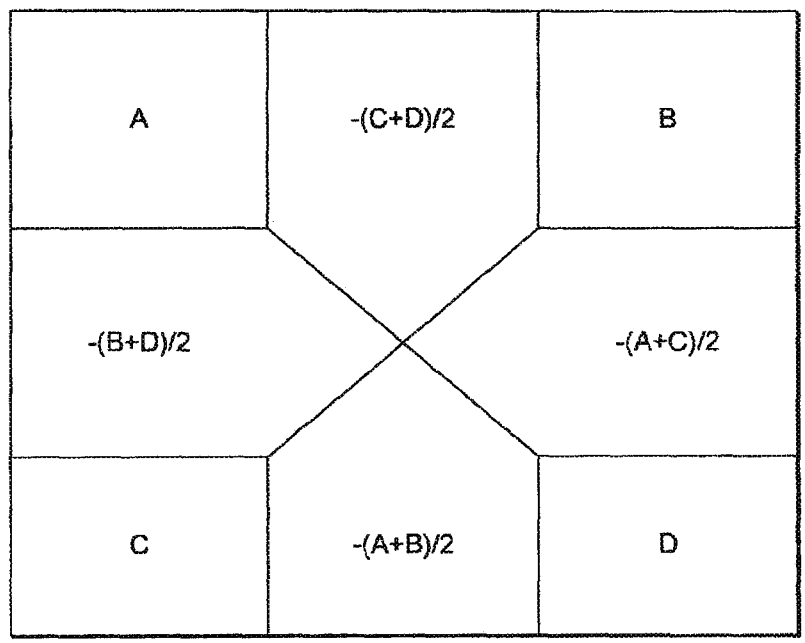
FIG. 34 shows an alternative geometry with only 4+4 electrodes.

Compare FIG. 34 with FIGS. 9, 14 and 15. The same effect as is achieved with FIG. 34 was also suggested in connection with FIG. 9. Comparing FIG. 34 with FIGS. 14 and 15, it will be seen that in FIGS. 14 and 15 the signal for each "extra" electrode was to compensate for the effect of its immediate neighbours. By contrast in FIG. 34 the signal for each "extra" electrode is chosen to compensate for the effect (on the displacement) of the pair of electrodes at the opposite edge, specifically the opposite corners.

The arrangement of FIG. 34 preserves the integrity of the two dipoles, but improves their drive-strengths. For the quadrupole, all the additional signals vanish, so again the balance is not affected. For the monopole case, all the additional signals are equal in value, so we have the same constraints as for the 5-input options (4+1). This means we may re-use all our earlier results regarding geometrical constraints.

Figure 35:
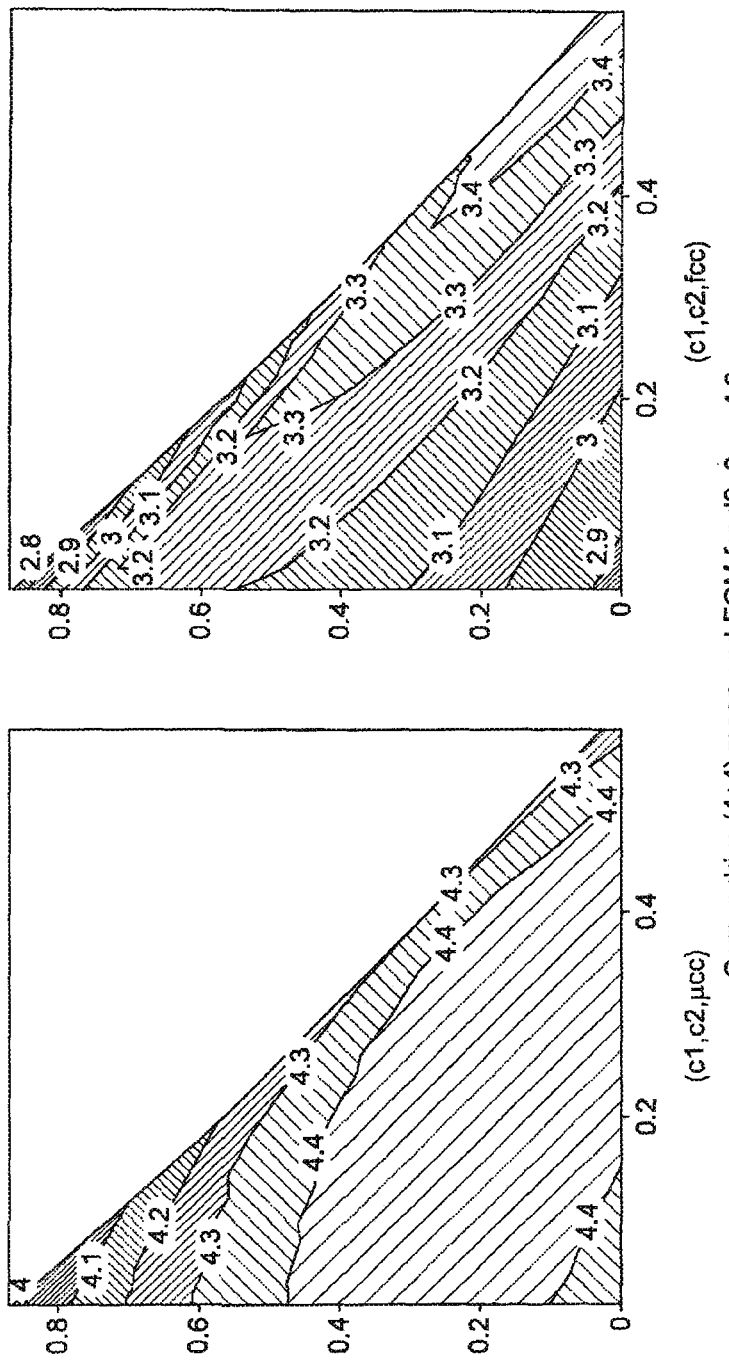
FIG. 35 shows corner drive mean and figures of merit for the arrangement of FIG. 34.

Although the requirements for balancing are identical to the 4+1 case, the optimisation is different. FIG. 35 shows the two figures of merit for the 4+4 case. The compromise set of c1≈0.6, c2≈0, d1≈0 gives the best FOM (3.49), while the best mean value is fairly insensitive to the values of c1 or c2, but peaks at around c1≈0.26, c2≈0.14, d1≈0.45 (mean=4.48). The mean values are typically about 4.3 to 4.4 for the (4+4) system, or around 25% (2 dB) higher than for the (4+1) system.

Figure 36:
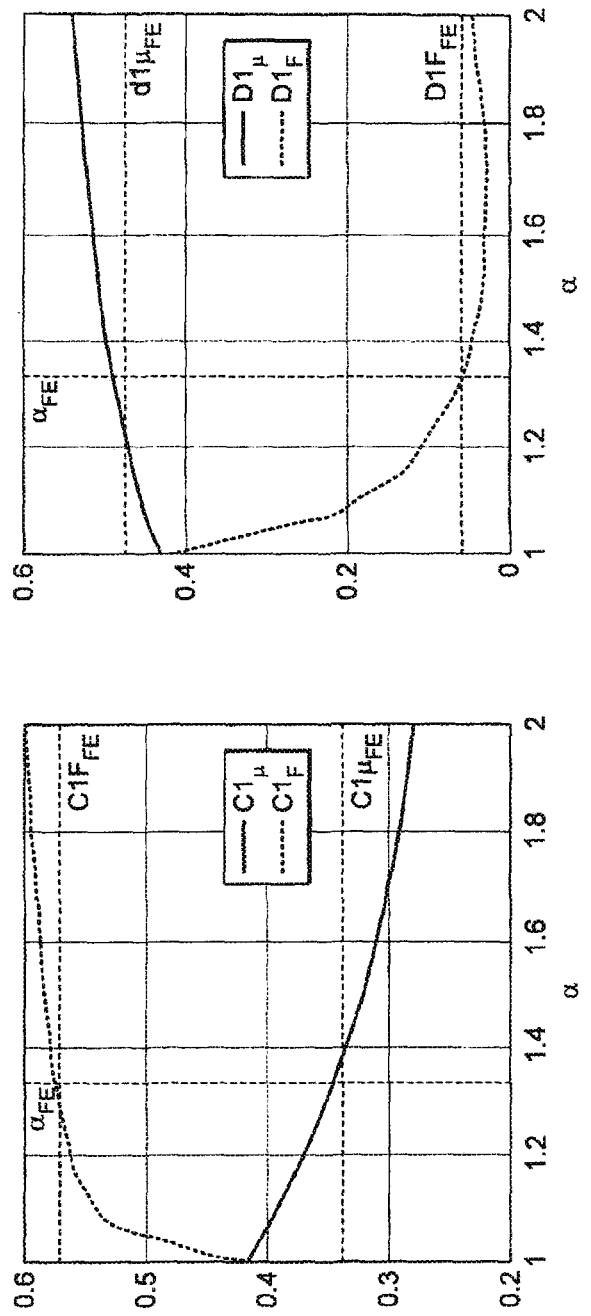
FIG. 36 shows side dimension values vs aspect ratio with finite element results.
Figure 37:
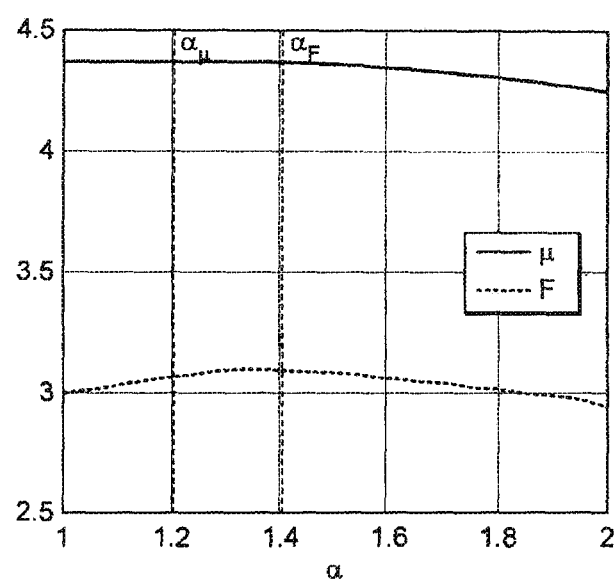
FIG. 37 shows optimized values of mean and figure of merit by aspect ratio for a 4+4 system with two variable side dimensions set to zero.

A range of solutions with c2≈0 would encompass both reasonably high mean and FOM values, so the sets of solutions using this was examined for different aspect ratios. For very low aspect ratios (α≈1), the same geometry optimises both the mean (μ) and FOM (F) values, but this changes quite quickly (FIG. 36). The optimal values vary with aspect ratio too, but not wildly (FIG. 37). For a constant surface area, the optimal aspect ratios are about 1.2 for the mean and about 1.4 for the FOM (ratio of mean to standard deviation).

In the foregoing the two corner-drive systems shared the same geometrical constraints for acoustic balance, and at least one common set compromise optimal parameters. There was some effect from the aspect ratio, but it was seen to be generally small.

Of the 4+1 systems considered, the corner-drive systems were generally to be preferred. The 4+4 system was shown to provide a useful gain in sensitivity, with similar or improved cost in terms of the ratio of mean to standard deviation.

Geometries with Sensor

The ability to sense the deflection of the panel is possibly desirable—either to provide electrical feedback as part of a closed-loop control system, or to refine aspects of the user interface. It is electrically simpler if the sense circuit is entirely separate from the drive circuit but, in direct-bender applications, this reduces the active area for driving. Consequentially, if sense electrodes are to be provided, the geometry or the drive matrix or other parameters of the system must be modified to retain balance for quiet haptics or whatever other effect the drive channels are desired to achieve.

With grounded exciters as discussed above the possibilities for providing sensing electrodes and their positions can be explored to the same extent as the possibilities for driving electrodes. Initial considerations might focus on where the greatest response is likely to be obtained, but this will involve a trade off in terms of the ability to drive a panel. One possibility would be to provide sensing electrodes within the area of the driven electrodes. It would usually be practical to place them at the boundary between drive electrodes for ease of getting electrical connections to them.

The invention claimed is:

1. A method comprising:
sensing, by N+M transducers of a device comprising a panel which supports vibrations and the N+M transducers connected to the panel, a user input on the panel;
receiving, by signal processing circuitry electrically connected to and configured to receive signals from or provide signals to each of the N+M transducers, N+M input signals generated from respective ones of the N+M transducers in response to the user input on the panel; and
processing, by the signal processing circuitry, the N+M input signals to produce N output signals corresponding to input signals from the N transducers of the N+M transducers,
wherein the input signals from the M transducers of the N+M transducers are used to correct the input signals from the N transducers for one or more phenomena affecting all of the N+M transducers other than the user input, and
wherein, N and M are integers greater than or equal to one.

2. The method of claim 1, wherein the device is configured to sense acoustic vibrations and the input signals from the M transducers are used to reduce background noise in the input signals from the N transducers.

3. The method of claim 1, wherein the device is configured to sense acoustic vibrations and the input signals from the M transducers are used to improve the sensitivity of the device to low frequency vibrations.

4. The method of claim 1, wherein the device is configured to sense touch and the input signals from the M transducers are used to reduce the effects of common mode vibrations in the input signals from the N transducers.

5. The method of claim 1, wherein N is greater than M.

6. The method of claim 5, wherein M=N/2.

7. The method of claim 6, wherein M=1 and N=2.

8. A computer program product, encoded on one or more non-transitory computer storage media, comprising instructions that when executed by one or more computers cause the one or more computers to perform operations comprising:
receiving N+M input signals generated from respective ones of N+M transducers in response to a user input on a panel of a device comprising the panel which supports vibrations and the N+M transducers connected to the panel; and
processing the N+M input signals to produce N output signals corresponding to input signals from the N transducers of the N+M transducers,
wherein the input signals from the M transducers of the N+M transducers are used to correct the input signals from the N transducers for one or more phenomena affecting all of the N+M transducers other than the user input, and
wherein, N and M are integers greater than or equal to one.

9. The computer program product of claim 8, wherein the device is configured to sense acoustic vibrations and the input signals from the M transducers are used to reduce background noise in the input signals from the N transducers.

10. The computer program product of claim 8, wherein the device is configured to sense touch and the input signals from the M transducers are used to reduce the effects of common mode vibrations in the input signals from the N transducers.

11. The computer program product of claim 8, wherein N is greater than M.

12. The computer program product of claim 11, wherein M=N/2.

13. A device comprising:
a panel which supports vibrations,
N+M transducers connected to the panel, where N and M are integers greater than or equal to one; and
signal processing circuitry electrically connected to each of the N+M transducers and configured to:
receive N+M input signals generated from respective ones of the N+M transducers in response to a user input on the panel, and
process the N+M input signals to produce N output signals corresponding to the N transducers of the N+M transducers,
wherein the input signals from the M transducers of the N+M transducers are used to correct the input signals from the N transducers for one or more phenomena other than the user input affecting all of the N+M transducers.

14. The device of claim 13, wherein the user input on the panel comprises acoustic vibrations, and wherein the input signals from the M transducers are configured to reduce background noise in the input signals from the N transducers.

15. The device of claim 13, wherein the user input on the panel comprises touch, and wherein the input signals from the M transducers are configured to reduce the effects of common mode vibrations in the input signals from the N transducers.

16. The device of claim 13, wherein the user input on the panel comprises acoustic vibrations, and wherein the input signals from the M transducers are configured to improve the sensitivity of the device to low frequency vibrations.

17. The device of claim 13, wherein N=M/2.

18. The device of claim 16, wherein M=1 and N=2.

19. The device of claim 13, wherein the device is one of a mobile communications device, tablet computing device, or portable personal computer.

20. The device of claim 13, wherein the panel comprises a substrate, a layer of electroactive material applied to the substrate and a layer of material applied to the electroactive material forming at least three separate active areas whereby signals may be applied to or received from respective areas of the electroactive material,
wherein the at least three separate active areas comprise at least two primary active areas and at least one secondary active area, the secondary active area being positioned relative to the two primary active areas such that one or both of the following conditions is provided:
at least one secondary active area can be driven to at least partially offset any net displacement of the panel caused by driving two of the primary active areas; and
the at least one secondary active area can sense vibrations of the panel affecting both of the two primary active areas.

* * * * *